US009423992B2

(12) United States Patent  
Takagi

(10) Patent No.: US 9,423,992 B2
(45) Date of Patent: Aug. 23, 2016

(54) MANAGEMENT SYSTEM AND CONTROL METHOD

(71) Applicant: CANON KABUSHIKI KAISHA, Tokyo (JP)

(72) Inventor: Noriko Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/828,970

(22) Filed: Aug. 18, 2015

(65) Prior Publication Data

US 2016/0054964 A1 Feb. 25, 2016

(30) Foreign Application Priority Data

Aug. 22, 2014 (JP) ................................. 2014-169272

(51) Int. Cl.
*G06F 3/12* (2006.01)
*G06K 15/00* (2006.01)

(52) U.S. Cl.
CPC ............ *G06F 3/1273* (2013.01); *G06F 3/1203* (2013.01); *G06F 3/1293* (2013.01)

(58) Field of Classification Search
None
See application file for complete search history.

(56) References Cited

U.S. PATENT DOCUMENTS

2011/0286026 A1* 11/2011 Matsuzawa ........... G06F 3/1222 358/1.14
2014/0063527 A1* 3/2014 Takagi ............... H04N 1/00344 358/1.13
2016/0054963 A1* 2/2016 Hamada ................ G06F 3/1273 358/1.15

FOREIGN PATENT DOCUMENTS

JP 2006-166040 A 6/2006

* cited by examiner

*Primary Examiner* — Dov Popovici
(74) *Attorney, Agent, or Firm* — Canon USA, Inc. I.P. Division

(57) ABSTRACT

A job history processing server issues second agent information for use of when first agent information cannot be acquired from an agent management server. Then, the job history processing server exports, as incomplete information, data received from a collection agent together with the issued second agent information.

13 Claims, 24 Drawing Sheets

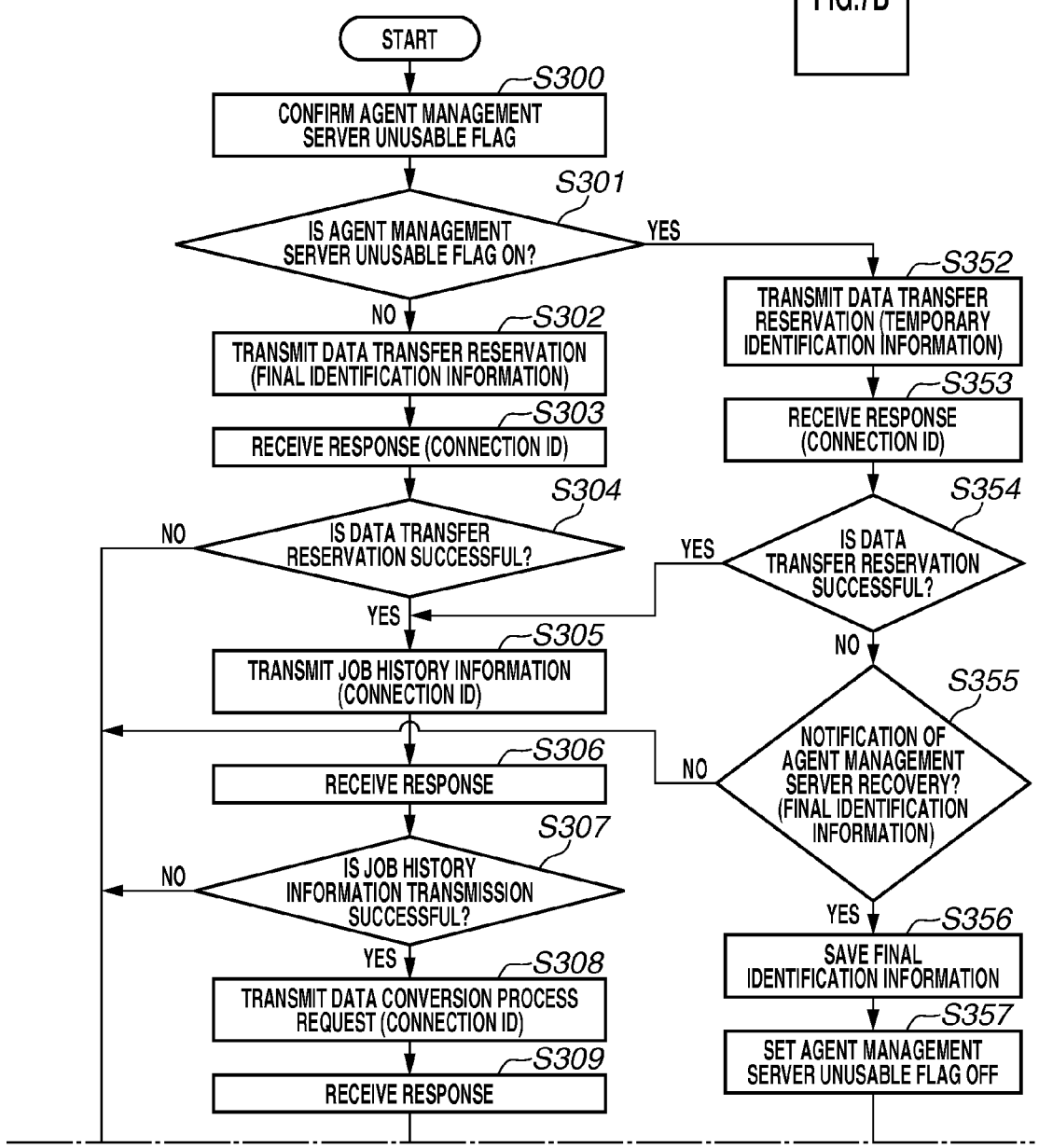

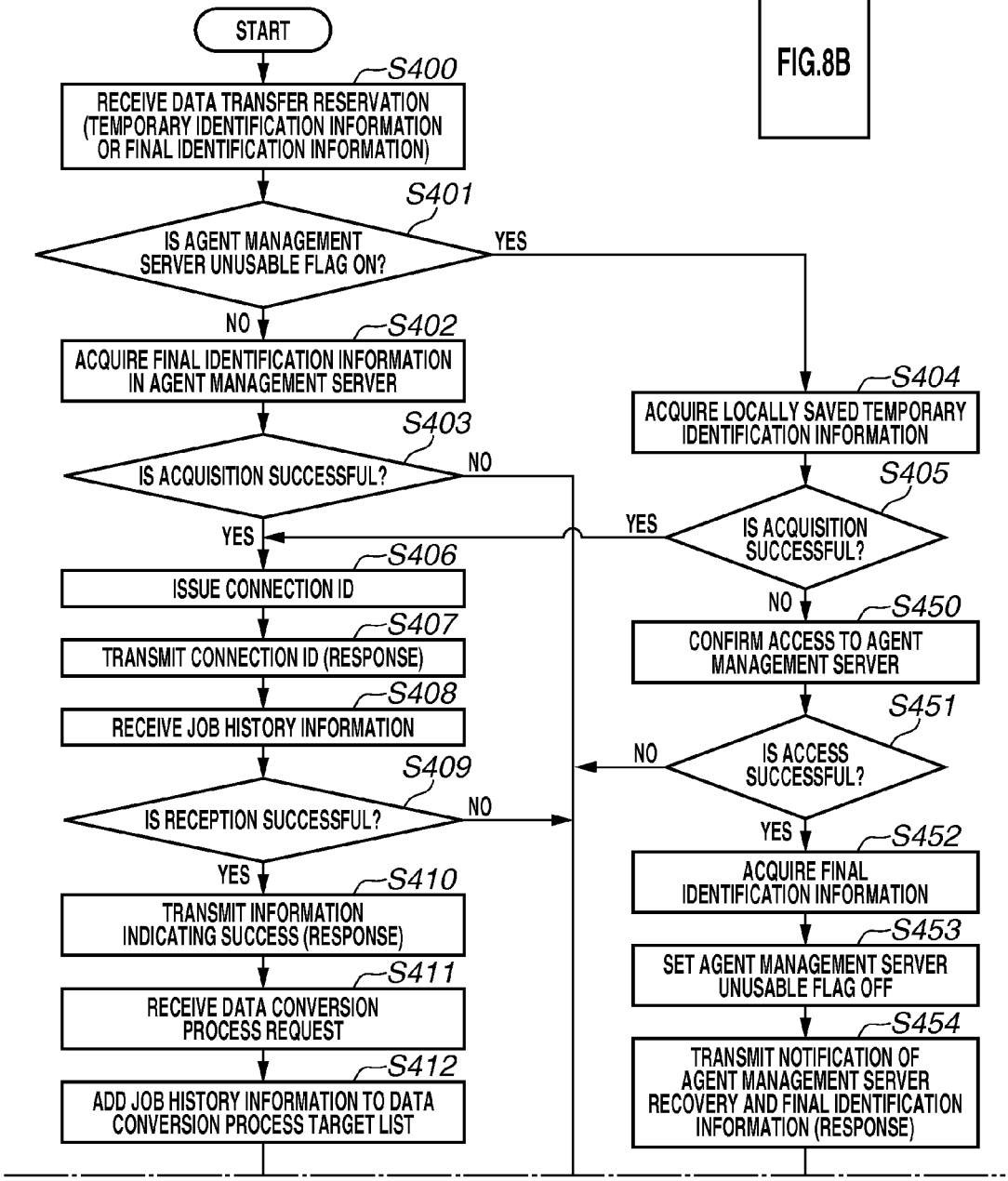

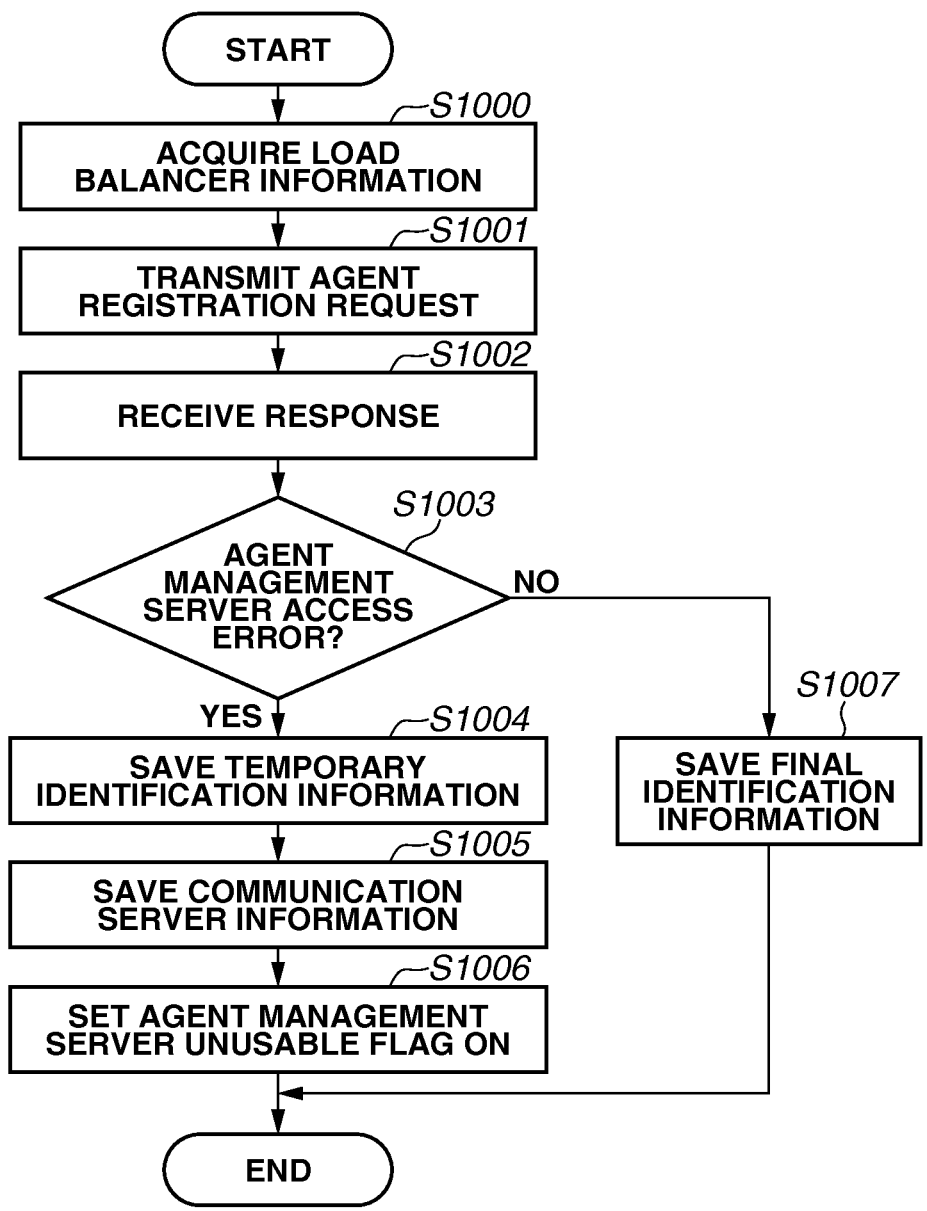

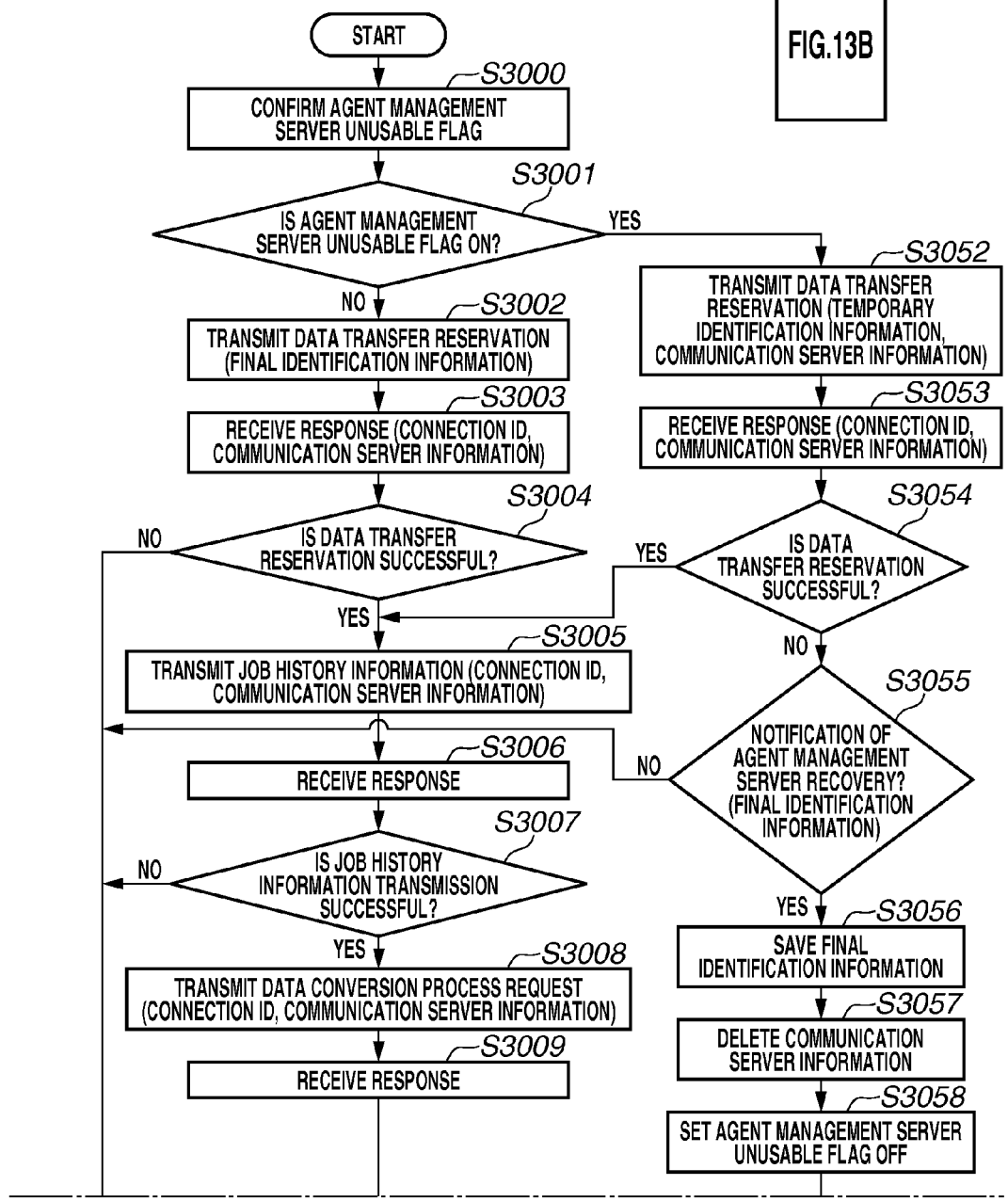

FIG.14

```
<?xml version="1.0" encoding="utf-8"?>
  :
<AgentIDManagement>
 <AgentID>5</AgentID>
</AgentIDManagement>
  :
```

FIG.15

```
<?xml version="1.0" encoding="UTF-8"?>
<AgentInformation version="3.00">
  <ConnectServerInfomation>
    <URL>http://123.456.789.000</URL>
  </ConnectServerInfomation>
  <AgentProperty>
    <AgentID>A</AgentID>
    <TotalDiskSpace>7167</TotalDiskSpace>
    <StatusCheckInterval>5</StatusCheckInterval>
    <DeviceName>MFP MODEL ABC</DeviceName>
    <SerialNumber>1234567890</SerialNumber>
    <IPAddress>111.222.333.444</IPAddress>
  </AgentProperty>
  <AgentStatus>
    <UsedAgentDiskSpace>0</UsedAgentDiskSpace>
    <FreeDiskSpace>7098</FreeDiskSpace>
    <RemainderJobCount>4</RemainderJobCount>
    <LastRegistrationResult>Success</LastRegistrationResult>
    <Status>Enable PowerSavingMode</Status>
  </AgentStatus>
  <TransferSchedule>
    <TransferMode>1</TransferMode>
    <TransferInterval>10</TransferInterval>
    <TransferStartTime>0:00</TransferStartTime>
    <TransferEndTime>8:00</TransferEndTime>
  </TransferSchedule>
  <AgentMngSrvUnusableFlag>ON</AgentMngSrvUnusableFlag>
</AgentInformation>
```

FIG.16

```
<?xml version="1.0" encoding="utf-8"?>
<AgentMngSrvInfo>
  <Path>¥¥ManageServer¥folder</Path>
  <UserName>Canon</UserName>
  <Password>Taro<Password>
  <UnusableFlag>ON</UnusableFlag>
</AgentMngSrvInfo>
```

FIG.17

```
<?xml version="1.0" encoding="UTF-8"?>
<AgentInformation version="3.00">
  <AgentProperty>
    <AgentID>A</AgentID>
    <TotalDiskSpace>7167</TotalDiskSpace>
    <StatusCheckInterval>5</StatusCheckInterval>
    <DeviceName>MFP MODEL ABC</DeviceName>
    <SerialNumber>1234567890</SerialNumber>
    <IPAddress>111.222.333.444</IPAddress>
  </AgentProperty>
  <AgentStatus>
    <UsedAgentDiskSpace>0</UsedAgentDiskSpace>
    <FreeDiskSpace>7098</FreeDiskSpace>
    <RemainderJobCount>4</RemainderJobCount>
    <LastRegistrationResult>Success</LastRegistrationResult>
    <Status>Enable PowerSavingMode</Status>
  </AgentStatus>
  <TransferSchedule>
    <TransferMode>1</TransferMode>
    <TransferInterval>10</TransferInterval>
    <TransferStartTime>0:00</TransferStartTime>
    <TransferEndTime>8:00</TransferEndTime>
  </TransferSchedule>
</AgentInformation>
```

FIG.18

```
<?xml versiorn="1.0" encoding="UTF-8"?>
<JobInformation>
  <AgentProperty>
    <AgentID>A</AgentID>
    <DeviceName>MFP MODEL ABC</DeviceName>
    <SerialNumber>1234567890</SerialNumber>
    <IPAddress>111.222.333.444</IPAddress>
  </AgentProperty>
  <JobInfo>
    <JobTime>Print</JobTime>
    <PrintStartTime>10:30</PrintStartTime>
    <PaperNum>3</PaperNum>
    <Result>OK</Result>
  </JobInfo>
</JobInformation>
```

FIG.20

```
<?xml version="1.0" encoding="UTF-8"?>
<AgentInformation version="3.00">
  <AgentProperty>
    <AgentID>6</AgentID>
    <TotalDiskSpace>7167</TotalDiskSpace>
    <StatusCheckInterval>5</StatusCheckInterval>
    <DeviceName>MFP MODEL ABC</DeviceName>
    <SerialNumber>1234567890</SerialNumber>
    <IPAddress>111.222.333.444</IPAddress>
  </AgentProperty>
  <AgentStatus>
    <UsedAgentDiskSpace>0</UsedAgentDiskSpace>
    <FreeDiskSpace>7098</FreeDiskSpace>
    <RemainderJobCount>4</RemainderJobCount>
    <LastRegistrationResult>Success</LastRegistrationResult>
    <Status>Enable PowerSavingMode</Status>
  </AgentStatus>
  <TransferSchedule>
    <TransferMode>1</TransferMode>
    <TransferInterval>10</TransferInterval>
    <TransferStartTime>0:00</TransferStartTime>
    <TransferEndTime>8:00</TransferEndTime>
  </TransferSchedule>
</AgentInformation>
```

FIG.21

```
<?xml version="1.0" encoding="UTF-8"?>
<JobInformation>
  <AgentProperty>
    <AgentID>6</AgentID >
    <DeviceName>MFP MODEL ABC</DeviceName>
    <SerialNumber>1234567890</SerialNumber>
    <IPAddress>111.222.333.444</IPAddress>
  </AgentProperty>
  <JobInfo>
    <JobTime>Print</JobTime>
    <PrintStartTime>10:30</PrintStartTime>
    <PaperNum>3</PaperNum>
    <Result>OK</Result>
  </JobInfo>
</JobInformation>
```

MANAGEMENT SYSTEM AND CONTROL METHOD

BACKGROUND OF THE INVENTION

1. Field of the Invention

The present invention relates to the control of a management system for receiving data to be collected from an agent operating on a network device, such as an image forming apparatus or an information processing apparatus.

2. Description of the Related Art

In recent years, with the spread of printers and digital multifunction peripherals (MFPs), there is a digital MFP for saving job history information in a storage device to prevent the leakage of information or to trace an information leaker, when a job, such as a print, copy, FAX, or electronic mail transmission job is executed. Further, it is also possible to add a function to a printer driver and save job history information in a storage device when a printing job from a print client personal computer (PC) is executed.

The job history information includes information about a user having executed the job, information about the date and time of the execution of the job, information (an Internet Protocol (IP) address, a serial number, or a media access control (MAC) address) for identifying a digital MFP or a print client PC having executed the job, and log attribute information, such as the type of the executed job. The job history information may further include image data which is obtained by forming data from an image input to the digital MFP or is obtained by forming data from a print target in the print client PC, and reduced image data which is obtained by reducing the image data.

A job history information processing system for processing such job history information includes the digital MFP, the print client PC and the like, i.e., a job history processing server and an agent management server.

In the digital MFP and the print client PC, a client application (hereinafter referred to as a "collection agent") for transmitting job history information recorded by the digital MFP or the printer driver to the job history processing server is installed.

Further, the job history processing server is a management system having an image processing function and a function of saving job history information in a storage device. Further, the agent management server has a function of saving setting information of the collection agent and information for issuing unique identification information in the system to the collection agent.

In such a job history information processing system, if the agent management server is stopped, it becomes not possible to issue unique identification information in the system to the collection agent.

As discussed in the publication of Japanese Patent Application Laid-Open No. 2006-166040, in a case where a server is stopped, it is possible to substitute a temporary server for the function of the server. The publication of Japanese Patent Application Laid-Open No. 2006-166040 is also directed to communicating with a server closest to the destination of a mobile terminal and has a necessary function, as a temporary server, whereby the throughput and response time are improved.

As described above, in the job history information processing system, in a case where the agent management server is stopped for some cause, it becomes not possible to issue unique identification information in the system to the collection agent. In the job history information processing system, in a case where the agent management server is stopped, it becomes not possible to perform a process where issuing of unique identification information is required, for example, a process of registering the collection agent in the agent management server.

In a conventional job history processing server, it is not possible to receive data transfer from a collection agent to which identification information has not been issued and perform processing. The reason for this is as follows. Job history information that is not associated with identification information of an agent is insufficient as information for identifying a collection agent (a digital MFP or a PC) having executed a job. Thus, such job history information prevents an external system, such as a job history checking system, from referencing information.

For this reason, in a case where the agent management server is stopped, for example, the job history processing server cannot receive job history information of a network device, such as a digital MFP or a printer, even though the network device is newly placed. Consequently, it is not possible to practically use the network device due to a security issue. This is because of the security problem that if the network device is used in such a state, it becomes not possible to transfer job history to an external system, such as a job history checking system, and therefore, it is not possible to trace the leakage of information.

The system discussed in the publication of Japanese Patent Application Laid-Open No. 2006-166040 has a configuration in which it is not necessary to issue unique identification information. Thus, the system cannot be applied to a job history information processing system for strictly managing identification information of a collection agent.

SUMMARY OF THE INVENTION

The present invention is directed to providing a mechanism for, for example, even in a case where a failure occurs in a service for managing an agent, receiving data from a network device that is transmitted from the agent and allowing the use of the network device in a state where traceability of when information is leaked is ensured.

According to an aspect of the present invention, a management system for receiving data to be collected from an agent operating on a network device includes an issuance unit configured to issue second agent information for use of when first agent information cannot be acquired from an agent management service, a reception unit configured to receive a data transfer reservation request including identification information of an agent, a request unit configured to request, from the agent management service, the first agent information corresponding to the identification information included in the reservation request, and an output unit configured to, in a case where the first agent information is acquired from the agent management service, export data received from the agent together with the acquired first agent information to an area where the data and the first agent information can be referenced by an external system, wherein, in a case where the first agent information cannot be acquired from the agent management service, the output unit exports, as incomplete information, data received from the agent together with the second agent information issued by the issuance unit to an area where the data and the second agent information can be referenced by the external system.

Further features of the present invention will become apparent from the following description of exemplary embodiments with reference to the attached drawings.

BRIEF DESCRIPTION OF THE DRAWINGS

FIG. 7 is a diagram including the flowcharts of FIGS. 7A and 7B. FIGS. 7A and 7B are flowcharts illustrating a job history information transmission process performed by the collection agent according to the first exemplary embodiment.

FIG. 8 is a diagram including the flowcharts of FIGS. 8A and 8B. FIGS. 8A and 8B are flowcharts illustrating a job history information reception process performed by the job history processing server.

FIG. 12 is a flowchart illustrating an agent registration request process performed by a collection agent according to the second exemplary embodiment.

FIG. 13 is a diagram including the flowcharts of FIGS. 13A and 13B. FIGS. 13A and 13B are flowcharts illustrating a job history information transmission process performed by the collection agent according to the second exemplary embodiment.

FIG. 14 is a diagram illustrating an example of information for issuing unique identification information in the system.

FIG. 15 is a diagram illustrating examples of communication server information, temporary identification information, and setting information that are saved in the collection agent.

FIG. 16 is a diagram illustrating an example of information about an agent management server.

FIG. 17 is a diagram illustrating examples of temporary identification information and setting information of the collection agent that are held in the job history processing server.

FIG. 18 is a diagram illustrating an example of log attribute information using the temporary identification information saved in the job history processing server.

FIG. 20 is a diagram illustrating examples of final identification information and setting information of the collection agent that are held in the agent management server.

FIG. 21 is a diagram illustrating an example of log attribute information using final identification information saved in the job history processing server.

DESCRIPTION OF THE EMBODIMENTS

Exemplary embodiments of the invention will be described in detail below with reference to the drawings.

Figure 1:
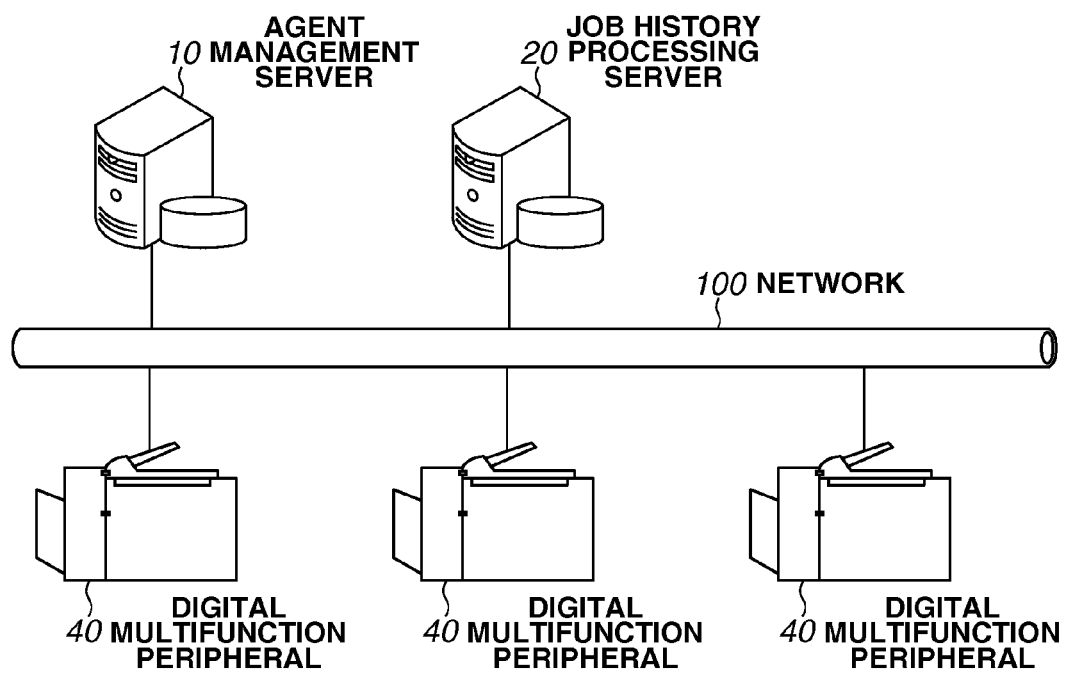
FIG. 1 is a diagram illustrating an overall configuration of a job history information processing system according to a first exemplary embodiment.

FIG. 1 is a diagram illustrating an example of the overall configuration of a job history information processing system according to a first exemplary embodiment of the present invention.

FIG. 1 illustrates a case where an agent management server 10, a job history processing server 20, and digital MFPs 40 are connected together via a network 100 in the system according to the present exemplary embodiment. Although the example of FIG. 1 illustrates three digital MFPs 40, the number of digital MFPs 40 may be one, two, or more than three. Further, although the example of FIG. 1 illustrates a single job history processing server 20, a case where there are a plurality of job history processing servers 20 will be described below in a second exemplary embodiment.

Figure 4:
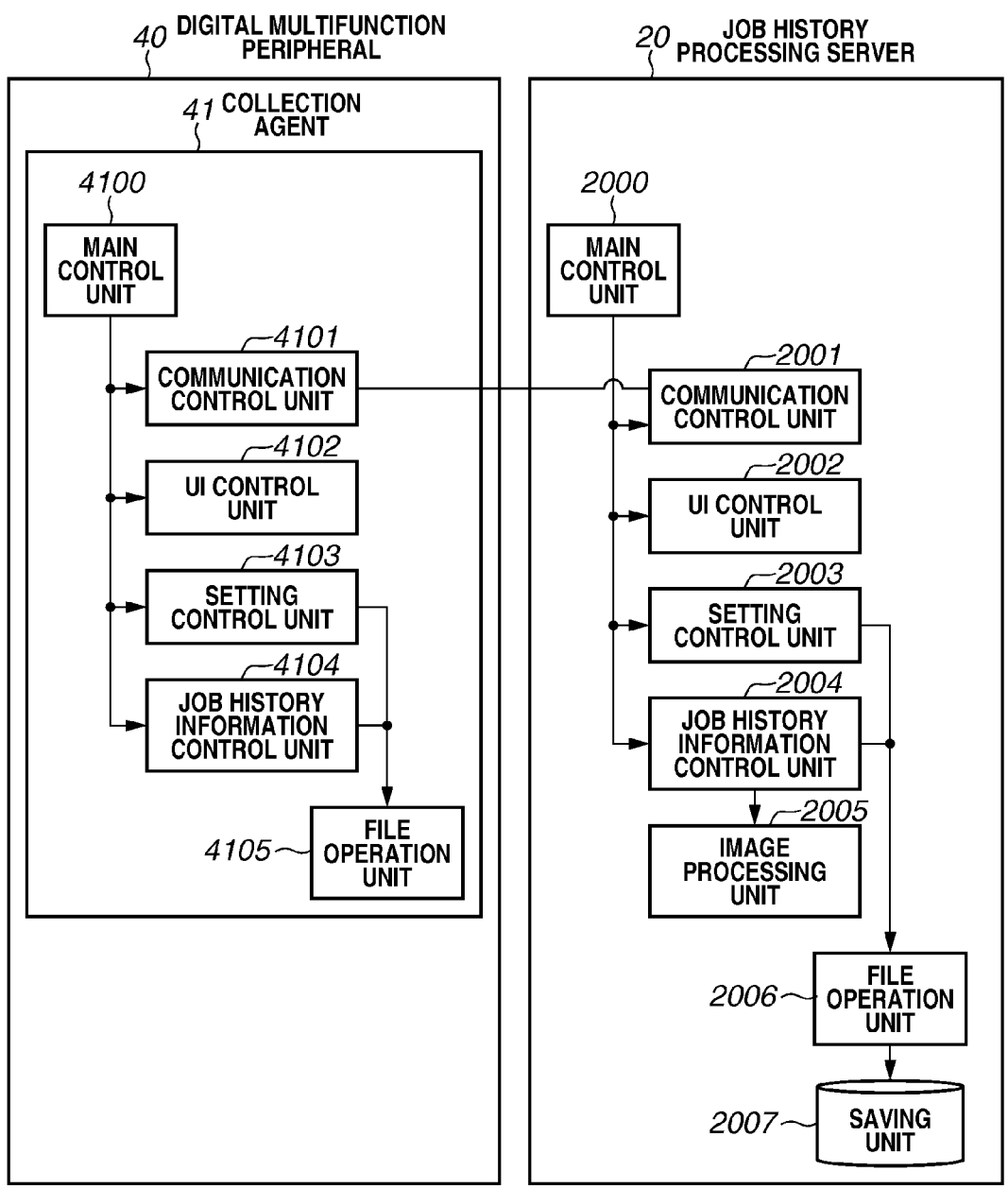
FIG. 4 is a diagram illustrating software configurations of the job history processing server and the digital MFP.

The agent management server 10 corresponds to an agent management service for managing a collection agent 41 and has a function of saving setting information of the collection agent 41 illustrated in FIG. 4. Further, the agent management server 10 holds "information for issuing unique identification information in the system" for the collection agent 41. An example of the "information for issuing unique identification information in the system" is illustrated in FIG. 14.

FIG. 14 is a diagram illustrating an example of the information for issuing unique identification information in the system. In FIG. 14, the value of an <AgentID> tag indicates the number of collection agents 41 managed by the agent management server 10 and corresponds to the information for issuing unique identification information in the system. In the example illustrated in FIG. 14, the information for issuing unique identification information in the system is "5". In this example, to a collection agent 41 to be registered next in the system, identification information indicating "6" is assigned, which is obtained by counting up the value of the <AgentID> tag from "5".

According to the present exemplary embodiment, an application is not present in the agent management server 10, the job history processing server 20 references information saved in the agent management server 10 and performs processing. That is, only a folder and a file are present in the agent management server 10, and the job history processing server 20 references the folder and the file and performs processing. Alternatively, an application for performing part or all of the processing performed by the job history processing server 20 according to the present exemplary embodiment may be installed in the agent management server 10.

The agent management server 10 may be included in the job history processing server 20.

The job history processing server 20 is a management system having an issuance function, a reception function, an image processing function, and a saving function.

The issuance function is a function of referencing the "information for issuing unique identification information in the system" held in the agent management server 10 and issuing unique identification information in the system.

The reception function is a function of receiving job history information from the collection agent 41. The job history information received by the reception function is subjected to a data conversion process by the image processing function and then is saved by the saving function.

The image processing function is a function of performing a data conversion process on job history information received by the reception function. The data conversion process is a process of performing an optical character recognition (OCR) process on image data to extract text information and converting the format of the image data. The text information obtained by the data conversion process is saved in such a manner that the text information is associated with the job history information, and the text information is used for searching the job history information.

The saving function is a function of saving, in a database or the like, job history information subjected to data conversion by the image processing function, and text information and the like associated with the job history information. According to the present exemplary embodiment, a folder in an external memory 209 of the job history processing server 20 are used for the saving function. Alternatively, any unit, such as a database or middleware, capable of saving job history information may be used for the saving function. Further, the location where the saving function saves data may be a storage area in an external system, such as a job history checking system having the function of storing and searching data to check job history. The location where the saving function saves data may only need to have a storage area where the data can be referenced by an external system, such as a job history checking system.

Each of the digital MFPs 40 is an MFP having functions, for example, scan, print, copy, electronic mail, and FAX, and having a function of recording job history information relating to a job executed on the digital MFP 40. According to the present exemplary embodiment, the job history information is recorded, for example, simultaneously with the execution of the job. The present invention, however, is not limited to this.

Further, a collection agent 41 is installed as a client application in the digital MFP 40. In a case where a job is executed, the digital MFP 40 temporarily saves job history information in a storage area (e.g., a hard disk drive (HDD) 404 illustrated in FIG. 2) on the digital MFP 40. Then, when the collection agent 41 receives a transmission instruction or immediately after a transmission time arrives, the collection agent 41 transmits the job history information to the job history processing server 20. According to the present exemplary embodiment, a description is given using the digital MFP 40 in which the collection agent 41 is implemented. Alternatively, an image forming apparatus capable of submitting a print job to a printer (e.g., an information processing apparatus, such as a PC capable of acquiring job history information by adding a function of a printer driver) may be used.

Figure 2:
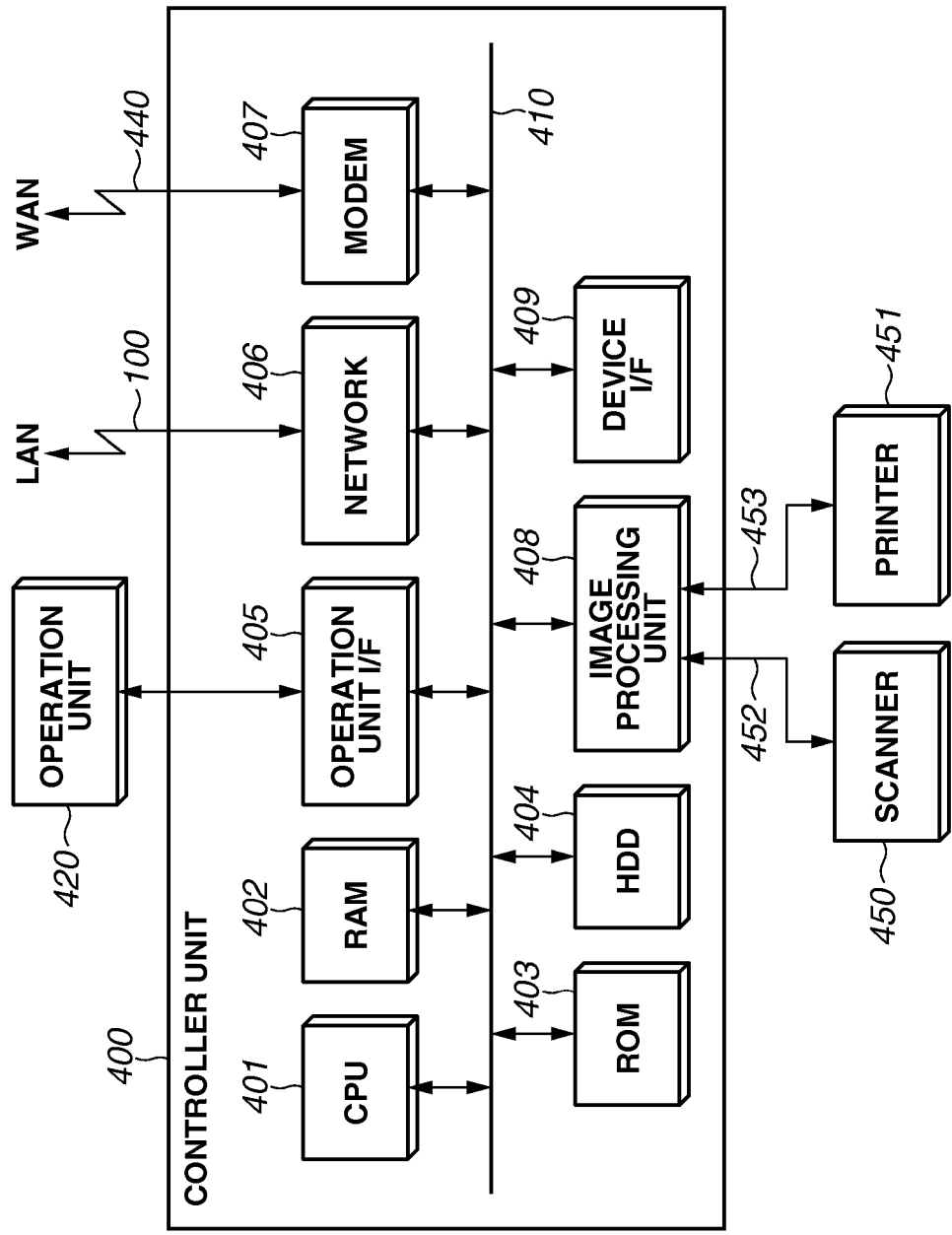
FIG. 2 is a diagram illustrating a hardware configuration of a digital multifunction peripheral (MFP).

FIG. 2 is a block diagram illustrating an example of the hardware configuration of the digital MFP 40.

FIG. 2 illustrates a controller unit 400. In the controller unit 400, a central processing unit (CPU) 401 is a controller for controlling the entire system. A random-access memory (RAM) 402 is a system work memory for the operation of the CPU 401 and is also an image memory (a buffer memory) for temporarily storing input image data. A read-only memory (ROM) 403 is a boot ROM and saves a boot program for the system.

The HDD 404 saves system software, a program for the collection agent 41, job history information, and image data in a user box. The program saved in the HDD 404 is loaded into the RAM 402 and executed. The processing of the collection agent 41 in each flowchart described below can be achieved in such a manner that the CPU 401 executes a program for the collection agent 41, the program being saved in the HDD 404. Instead of the HDD 404, another storage device, such as a solid-state drive (SSD), may be used.

An operation unit interface (I/F) 405 is an interface unit with an operation unit 420 and outputs screen data to be displayed on the operation unit 420 to the operation unit 420. Further, the operation unit I/F 405 serves to transmit, to the CPU 401, information input by an operator through the operation unit 420. It does not matter whether the operation unit 420 is a screen placed in the digital MFP 40 or a screen provided remotely to an external device, such as a PC, (a remote user interface (UI) displayed on a display 208 illustrated in FIG. 3) by a program in the digital MFP 40.

A network unit (Network) 406 connects to a network (LAN) 100, and inputs and outputs information. A modem (MODEM) 407 connects to a public line (WAN) 440, and inputs and outputs image data and digital MFP information.

An image processing unit 408 performs the process of rasterizing a page description language (PDL) code into a bitmap image, and image processing, such as correction, processing, and editing on input image data or output image data. Specifically, the image processing unit 408 performs a rotation process, a compression/decompression process, and a resolution conversion process on image data.

A device I/F unit 409 connects a scanner unit 450 and a printer unit 451, which are image input and output devices, to the controller unit 400 via an image input unit interface 452 and a printing unit interface 453 and converts image data.

The above devices are placed on a system bus 410.

Figure 3:
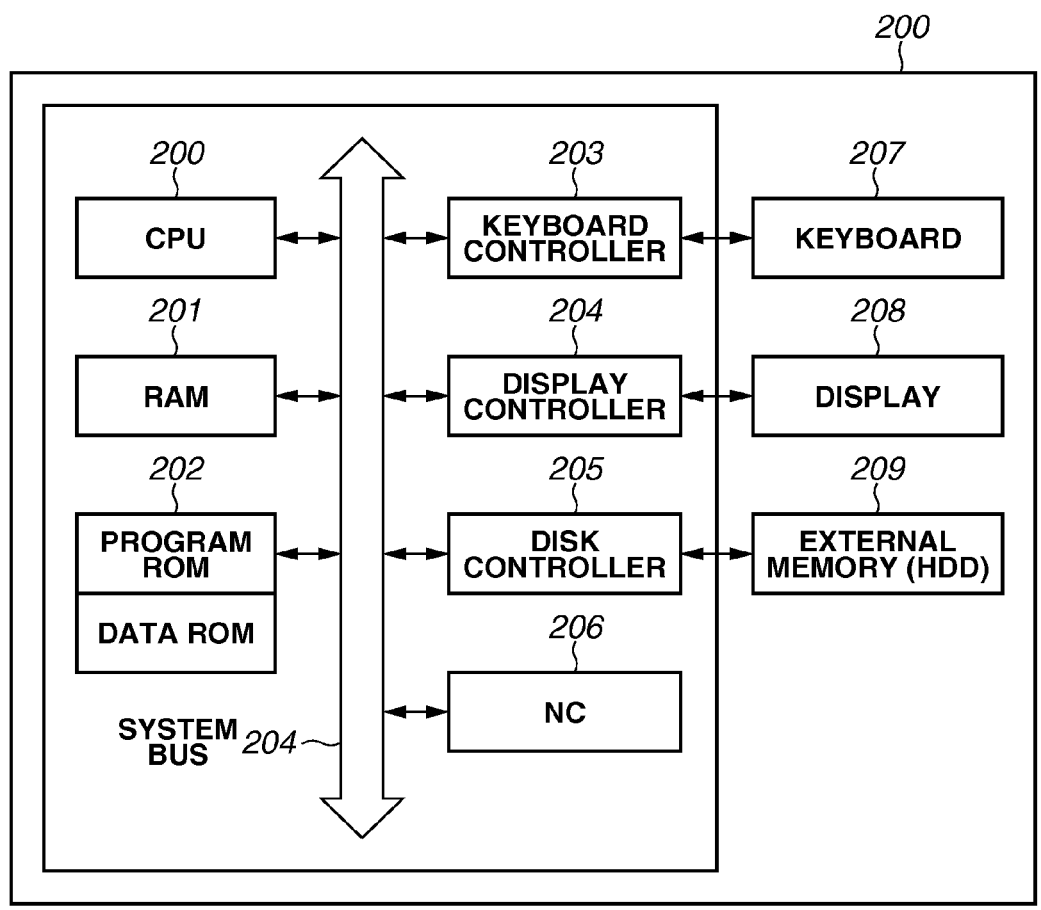
FIG. 3 is a diagram illustrating a hardware configuration of a job history processing server.

FIG. 3 is a diagram illustrating a hardware configuration of a PC forming the job history processing server 20 illustrated in FIG. 1. It is assumed that the hardware configuration illustrated in FIG. 3 corresponds to the hardware configuration of a general information processing apparatus. The hardware configuration of a general information processing apparatus can be applied to the PC according to the present exemplary embodiment.

In FIG. 3, a CPU 200 executes programs for an operating system and an application that are stored in a program ROM in a ROM 202 or loaded from the external memory 209 into a RAM 201, thereby achieving various types of control. The processing of each flowchart described below can be achieved by the CPU 200 executing these programs.

The RAM 201 functions as a main memory or a work area for the CPU 200. A keyboard controller 203 controls a key input from a keyboard 207 or a pointing device (not illustrated). A display controller 204 controls the display of various displays 208. A disk controller 205 controls data access in the external memory 209, such as an HDD or a Universal Serial Bus (USB) storage medium for storing various types of data. As the external memory 209, another storage device, such as an SSD may be used. A network card (NC) 206 is connected to the network 100 and performs the process of controlling communication with another device connected to the network 100.

FIG. 4 is a block diagram illustrating examples of the software configurations of the job history processing server 20 and the digital MFP 40.

In the software configuration of the digital MFP 40, the digital MFP 40 includes a digital MFP controller (not illustrated) and the collection agent 41.

The digital MFP controller (not illustrated) is implemented as a program (system software) saved in the ROM 403 or the HDD 404 and functions in such a manner that the CPU 401 executes the program. The digital MFP controller controls the entire system of the digital MFP 40. Further, the digital MFP controller executes a job based on an instruction received from a user through the operation unit I/F 405. When executing the job, the digital MFP controller generates job history information and saves the job history information in the HDD 404. The job history information is, for example, log information of the job executed by the digital MFP 40, the log information including an image to be input or output according to the type of the job (a job history image), and job history attribute information having information about, for example, the date and time of the execution of the job and a user having executed the job. As described above, the job history information is recorded by the digital MFP 40.

The collection agent 41 is implemented as a program installed in the digital MFP 40 (a program saved in the HDD 404) and functions in such a manner that the CPU 401 executes the program.

In the collection agent 41, a main control unit 4100 controls the entire collection agent 41, and instructs and manages components described later. The main control unit 4100 gives a communication instruction to a communication control unit 4101, a setting control instruction to a setting control unit 4103 according to the content of a user instruction through a UI control unit 4102, and a job history information control instruction to a job history information control unit 4104.

The communication control unit 4101 transmits job history information, setting information, and a processing request to the job history processing server 20 and receives a response from the job history processing server 20.

The UI control unit 4102 performs overall control of processing relating to a user operation in the collection agent 41. Specifically, the UI control unit 4102 displays a UI on the operation unit 420 of the digital MFP 40 or displays on a display 208 a screen (a remote UI) provided remotely to an external device, such as a PC, and transfers to the main control unit 4100 the content of an instruction received from the user.

The setting control unit 4103 controls setting information, such as an operating condition relating to the collection agent 41. The setting control unit 4103 receives an instruction to set an operating condition from the UI control unit 4102 via the main control unit 4100, references and saves setting information via a file operation unit 4105, and transmits the setting information to the job history processing server 20 via the communication control unit 4101. The setting information to be referenced and saved by the setting control unit 4103 includes identification information (an agent identification (ID)) of the collection agent 41, an agent name, and a MAC address or a serial number for identifying a digital MFP 40 having executed a job. Further, the setting information may also include a status and a schedule for transmitting job history information to the job history processing server 20. The setting control unit 4103 updates the setting information at a predetermined timing, such as, when the setting control unit 4103 receives a change instruction from the user through the UI control unit 4102, and when the collection agent 41 inquires of the job history processing server 20 about the latest information at regular intervals.

According to an instruction from the main control unit 4100, the job history information control unit 4104 acquires job history information via the file operation unit 4105 and transmits the job history information to the job history processing server 20 via the communication control unit 4101.

The file operation unit 4105 is a control unit for inputting and outputting setting information, image data, and job history information in the HDD 404 and receives a processing request from each component, thereby performing processing.

In the job history processing server 20, a main control unit 2000 controls the entire job history processing server 20, and instructs and manages components described below.

A communication control unit 2001 receives job history information and setting information from the communication control unit 4101 of the collection agent 41 and also transmits a response to a processing request from the collection agent 41. The job history information received by the communication control unit 2001 is saved in a saving unit 2007 via the main control unit 2000 and a setting control unit 2003. Further, the setting information received by the communication control unit 2001 is transferred to the setting control unit 2003 via the main control unit 2000.

A UI control unit 2002 displays a user interface on the display 208 of the job history processing server 20 and receives an instruction from the user through the keyboard 207 or a pointing device (not illustrated). Setting information specified by the user is saved in the saving unit 2007 via the main control unit 2000 and the setting control unit 2003.

The setting control unit 2003 controls the job history processing server 20, and identification information of the collection agent 41, and setting information relating to the operation of the collection agent 41. The setting control unit 2003 receives via the main control unit 2000 a request to register the collection agent 41 in the system, references the "information for issuing unique identification information in the system" in the agent management server 10, issues identification information of the collection agent 41, and then saves the identification information in the saving unit 2007. Further, the setting control unit 2003 receives an instruction to set an operation from the user or the collection agent 41 via the main control unit 2000 and saves the setting information in the saving unit 2007.

A job history information control unit 2004 receives via the main control unit 2000 an instruction to reference and store job history information and controls job history information according to the instruction.

An image processing unit 2005 performs an OCR process on job history information (image data) and converts the image format of the image data, according to an instruction from the job history information control unit 2004.

A file operation unit 2006 receives an instruction from each control unit, and references and saves identification information, setting information, and job history information in the saving unit 2007.

The saving unit 2007 is a storage device, corresponds to the external memory 209 of the job history processing server 20 illustrated in FIG. 3 in the present exemplary embodiment, and saves identification information, setting information, and job history information. The saving unit 2007 may only need to be a storage area where the identification information, the setting information, and the job history information can be referenced by an external system, such as a job history checking system. The saving unit 2007 may be present on any of the apparatuses.

Figure 5:
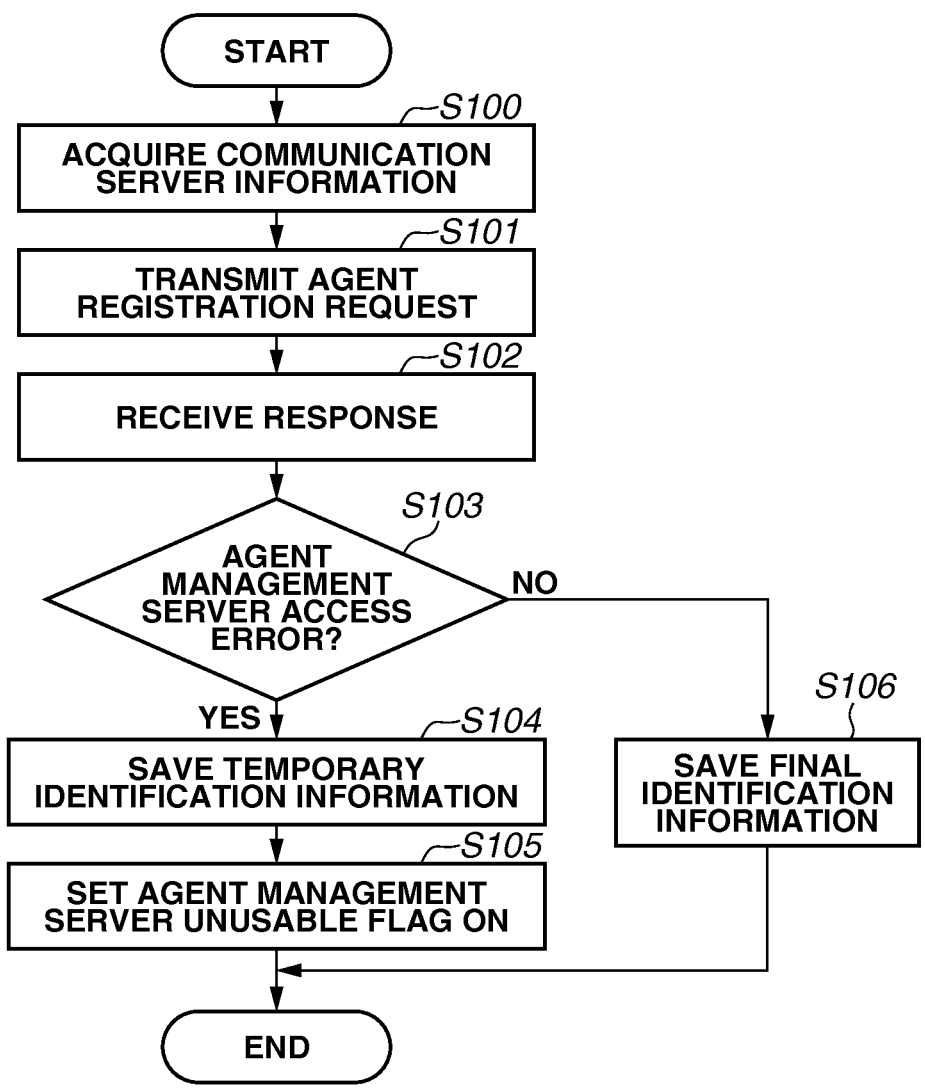
FIG. 5 is a flowchart illustrating an agent registration request process performed by a collection agent according to the first exemplary embodiment.

FIG. 5 is a flowchart illustrating an example of an agent registration request process for registering the collection agent 41 in the system according to the first exemplary embodiment. This process is processing performed when the collection agent 41 is started for the first time or when an execution instruction is received from the user. Each step illustrated in the flowchart in FIG. 5 is achieved in such a manner that the CPU 401 of the digital MFP 40 executes a program for achieving the collection agent 41, the program stored in the ROM 403 or the HDD 404. Further, the CPU 401 uses the RAM 402 or the HDD 404 as a storage area, where necessary.

In step S100, the UI control unit 4102 acquires communication server information from the user through the operation unit 420 of the digital MFP 40 or a screen provided remotely to an external device, such as a PC, and saves the communication server information in the HDD 404. Specifically, the UI control unit 4102 displays on the operation unit 420 or the display 208 of the PC a screen for urging the user to input the IP address or the host name of a communication server and waits for an input from the user. In a case where the user inputs information about the communication server, the UI control unit 4102 acquires the input value via the operation unit I/F 405 or the keyboard controller 203 and transfers the input value to the main control unit 4100. The main control unit 4100 instructs the setting control unit 4103 to save, in the HDD 404 via the file operation unit 4105, the information about the communication server input by the user. According to the present exemplary embodiment, as illustrated in FIG. 15, the information about the communication server is held as a file together with setting information of the collection agent 41 and saved as the value of a <URL> tag.

FIG. 15 is a diagram illustrating examples of the communication server information, temporary identification information, and the setting information saved in the collection agent 41.

In step S101, the main control unit 4100 transmits an agent registration request together with the setting information to the job history processing server 20 via the communication control unit 4101. The agent registration request is performed to request the job history processing server 20 to perform the process of registering the collection agent 41 in the system. Specifically, the job history processing server 20 is requested to issue unique collection agent identification information in the system and save the setting information of the collection agent 41 in the agent management server 10 or the saving unit 2007.

As described above, the setting information includes an agent name, a MAC address or a serial number for identifying a digital MFP 40 having executed a job, a status, and a schedule for transmitting job history information to the job history processing server 20. According to the present exemplary embodiment, the agent registration request and the setting information are simultaneously transmitted. Alternatively, communication in different sequences (the process of calling different application programming interfaces (APIs)) may be performed.

In step S102, the communication control unit 4101 receives a response from the job history processing server 20. The received response includes the success or failure in response to the agent registration request and identification information (final identification information or temporary identification information) of the collection agent 41 issued by the job history processing server 20.

In step S103, the communication control unit 4101 confirms the content of the response received in step S102 and determines whether the agent registration request is in an "agent management server access error". In this determination, in a case where the received response includes information indicating an "agent management server access error", it is determined that the agent registration request is in an "agent management server access error".

Then, in a case where it is determined that the agent registration request is in an "agent management server access error" (YES in step S103), the processing proceeds to step S104.

In step S104, the communication control unit 4101 saves the identification information included in the response received in step S102, as temporary identification information in the HDD 404 via the file operation unit 4105. An example of the data to be saved is illustrated in FIG. 15.

In the example illustrated in FIG. 15, the temporary identification information is saved as "A" in an <AgentID> tag. According to the present exemplary embodiment, temporary identification information and final identification information are saved and managed in the same tag, but may be saved and managed in different tags.

In step S105, the communication control unit 4101 sets an "agent management server unusable flag" on, and the processing of this flowchart ends.

The "agent management server unusable flag" may be information held on a memory (the RAM 402). Alternatively, the "agent management server unusable flag" may be saved as a file in the HDD 404 and determined based on the presence or absence of the file. Yet alternatively, some value may be saved in a database. Further, information for determining the on/off state of the flag may be a numerical value of 0 or 1 (bit), or may be text, such as yes or no. According to the present exemplary embodiment, the "agent management server unusable flag" is saved as part of the setting information in the HDD 404 via the file operation unit 4105. Specifically, in the example of FIG. 15, the "agent management server unusable flag" is managed as a value of on or off in an <AgentMngSrvUnusableFlag> tag.

In a case where, on the other hand, it is determined in step S103 that the agent registration request is not in an "agent management server access error" (NO in step S103), the processing proceeds to step S106.

In step S106, the communication control unit 4101 saves the identification information included in the response received in step S102, as final identification information in the HDD 404 via the file operation unit 4105, and the processing of this flowchart ends. As described above in step S104, according to the present exemplary embodiment, temporary identification information and final identification information are saved in the same tag, and therefore, the final identification information is saved as the value of the <AgentID> tag illustrated in FIG. 15.

Figure 6:
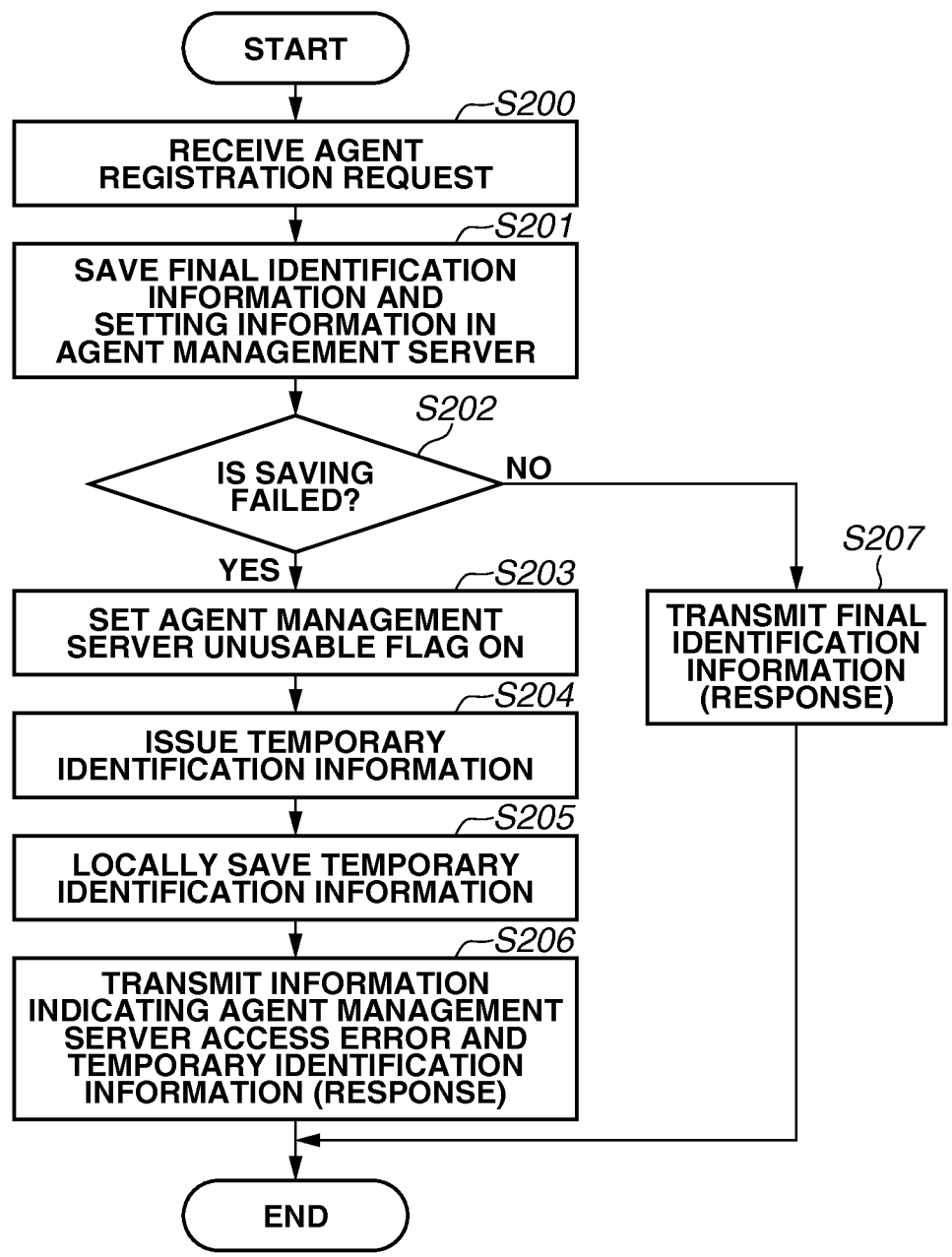
FIG. 6 is a flowchart illustrating an agent registration process performed by the job history processing server.

FIG. 6 is a flowchart illustrating an example of an agent registration process when the job history processing server 20 receives from the collection agent 41 an agent registration request to register the collection agent 41 in the system. Each step illustrated in the flowchart in FIG. 6 is achieved in such a manner that the CPU 200 of the job history processing server 20 executes a program stored in the external memory 209. Further, the CPU 200 uses the RAM 201 or the external memory 209 as a storage area, where necessary.

In step S200, the communication control unit 2001 receives an agent registration request from the collection agent 41. The communication control unit 2001 also simultaneously receives setting information transmitted from the collection agent 41 in step S101 in FIG. 5.

In step S201, the communication control unit 2001 instructs, via the main control unit 2000, the setting control unit 2003 to issue final identification information and save in the agent management server 10 the final identification information and the setting information received in step S200. According to the instruction, the setting control unit 2003 accesses the agent management server 10, references the "information for issuing unique identification information in the system" held in the agent management server 10, and issues final identification information. In the example illustrated in FIG. 14, the value of the <AgentID> tag as the "information for issuing unique identification information in the system" is "5", and therefore, the setting control unit 2003 counts up this value by 1 to issue "6" as the final identification information. In a case where the issuance of the final identification information is successful, the setting control unit 2003 saves the final identification information in the external memory 209 of the agent management server 10 in such a manner that the final identification information is associated with the setting information received in step S200. An example of the data saving the final identification information is "AgentID" in FIG. 20.

FIG. 20 is a diagram illustrating examples of the final identification information and the setting information of the collection agent 41 that are held in the agent management server 10.

In step S202, the setting control unit 2003 determines whether the saving process in step S201 is successful or failed.

Then, in a case where it is determined that the saving process in step S201 is successful (NO in step S202), the processing proceeds to step S207.

In step S207, the setting control unit 2003 transmits, to the collection agent 41 via the main control unit 2000 and the communication control unit 2001, information indicating the success of the agent registration process and the final identification information, and the processing of this flowchart ends.

In a case where, on the other hand, it is determined that the process of step S201 is failed (YES in step S202), the processing proceeds to step S203.

In step S203, the setting control unit 2003 sets an "agent management server unusable flag" on.

The "agent management server unusable flag" may be information held on a memory (the RAM 201 of the job history processing server 20). Alternatively, the "agent management server unusable flag" may be saved as a file in the external memory 209 of the job history processing server 20 and determination is performed based on the presence or absence of the file. Yet alternatively, some value may be saved in a database. Further, information for determining the on/off state of the flag may be a numerical value of 0 or 1 (bit), or may be text, such as yes or no. According to the present exemplary embodiment, the "agent management server unusable flag" is saved as part of setting information of the job history processing server 20 in the external memory 209 via the file operation unit 2006. Specifically, in FIG. 16, the "agent management server unusable flag" is managed as a value of on or off in a <UnusableFlag> tag.

FIG. 16 is a diagram illustrating an example of an Extensible Markup Language (XML) file describing information about the agent management server 10. The XML file also saves a folder path to a folder in which information about the collection agent 41 is saved, and information about access to the folder (a user name and a password).

In step S204, the setting control unit 2003 issues temporary identification information. The setting control unit 2003 confirms whether existing temporary identification information is present. In a case where existing temporary identification information is present, the setting control unit 2003 issues temporary identification information using a value that makes the identification information unique. The temporary identification information may be a simple numerical value or may be a value (e.g., a MAC address or a serial number) in the setting information received from the collection agent 41 in step S200. Further, the temporary identification information may be a value obtained by combining a value in the setting information with the current date and time.

In step S205, the setting control unit 2003 saves the temporary identification information issued in step S204 and the setting information received from the collection agent 41 in step S200 in such a manner that the temporary identification information and the setting information are associated with each other. At this saving process, the setting control unit 2003 saves the temporary identification information and the setting information in the saving unit 2007 via the file operation unit 2006.

FIG. 17 is a diagram illustrating an example of the data to be saved in step S205 in FIG. 6.

In FIG. 17, the temporary identification information is saved as "A" in an <AgentID> tag. Further, as the setting information, information, such as the serial number and the IP address of the digital MFP 40 in which the collection agent 41 is installed, the status of the collection agent 41, and a schedule for transferring job history information is saved.

In step S206, the setting control unit 2003 transmits information indicating an "agent management server access error" and the temporary identification information to the collection agent 41 via the main control unit 2000 and the communication control unit 2001, and the processing of this flowchart ends.

Figure 7B:
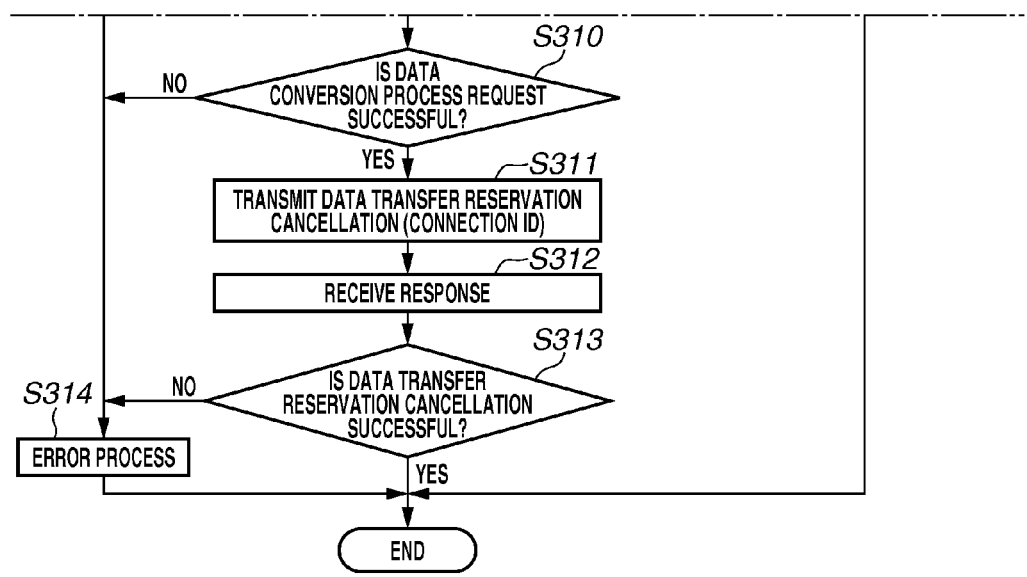

FIG. 7 is a diagram including the flowcharts of FIGS. 7A and 7B. FIGS. 7A and 7B are flowcharts illustrating a process where the collection agent 41 according to the first exemplary embodiment transmits job history information to the job history processing server 20 (a job history information transmission process). The job history information transmission process is performed when the collection agent 41 receives a transmission instruction from the user through a screen displayed on the operation unit 420 or the display 208, or immediately after a transmission time arrives (or every certain period of time). Each step illustrated in the flowchart in FIG. 7 is achieved in such a manner that the CPU 401 of the digital MFP 40 executes a program for achieving the collection agent 41, the program being stored in the ROM 403 or the HDD 404. Further, the CPU 401 uses the RAM 402 or the HDD 404 as a storage area, where necessary. The flowchart in FIG. 7 illustrates the process of transmitting a single record of job history. In a case where there are a plurality of records of job history in the HDD 404, the processing illustrated in FIG. 7 is repeated as many times as the number of records of job history in the HDD 404.

In step S300, the communication control unit 4101 confirms the "agent management server unusable flag" (the value of the <AgentMngSrvUnusableFlag> tag in FIG. 15).

In step S301, the communication control unit 4101 determines whether the "agent management server unusable flag" is on.

Then, if it is determined that the "agent management server unusable flag" is off (NO in step S301), the processing proceeds to step S302.

In step S302, the communication control unit 4101 transmits a data transfer reservation together with final identification information saved in step S106 in FIG. 5 to the job history processing server 20. The data transfer reservation refers to the process of notifying the job history processing server 20 that job history information is to be transmitted to the job history processing server 20. In this process, preparations are performed in order that the job history processing server 20 appropriately processes a sequence in which the collection agent 41 transmits job history information. The details will be described below with reference to FIG. 8. The communication control unit 4101 identifies the job history processing server 20 as the transmission destination, using the information about a communication server saved in step S100 in FIG. 5. At this process, the final identification information saved in step S106 in FIG. 5 is also simultaneously transmitted, whereby the job history processing server 20 becomes capable of identifying the collection agent 41.

In step S303, the communication control unit 4101 receives a response from the job history processing server 20. At this process, the response includes at least the success or failure of the data transfer reservation process and a connection ID. The connection ID is information for the job history processing server 20 to manage the sequence of the job history information transmission process. This connection ID is used until the current job history information transmission process is completed. Thus, the communication control unit 4101 needs to hold the connection ID on a memory (the RAM 402) or the HDD 404.

In step S304, the communication control unit 4101 confirms the content of the response received in step S303 and determines whether the data transfer reservation process is successful.

Then, in a case where it is determined that the data transfer reservation process is failed (NO in step S304), then in step S314, the communication control unit 4101 performs an error process. The details will be described later.

In a case where, on the other hand, it is determined in step S304 that the data transfer reservation process is successful (YES in step S304), the processing proceeds to step S305.

In step S305, the communication control unit 4101 transmits job history information together with the connection ID received in step S303 to the job history processing server 20. The job history information is acquired from the job history information control unit 4104 via the main control unit 4100 by the communication control unit 4101. The job history information control unit 4104 acquires the job history information from the HDD 404 via the file operation unit 4105. Further, in the process of transmitting the job history information, the communication control unit 4101 transmits log attribute information included in the job history information and image data, according to a prescribed sequence. In a case where the data size is large as in image data, it is possible to perform transmission in such a manner that the image data is divided into pages, or the image data is divided into smaller data sizes.

In step S306, the communication control unit 4101 receives a response from the job history processing server 20. This response includes at least the success or failure of the job history information transmission process.

In step S307, the communication control unit 4101 confirms the content of the response received in step S306 and determines whether the job history information transmission process is successful.

Then, in a case where it is determined that the job history information transmission process is failed (NO in step S307), then in step S314, the communication control unit 4101 performs an error process. The details will be described later.

In a case where, on the other hand, it is determined in step S307 that the job history information transmission process is successful (YES in step S307), the processing proceeds to step S308.

In step S308, the communication control unit 4101 transmits a data conversion process request together with the connection ID received in step S303 to the job history processing server 20. The data conversion process request is made to request the job history processing server 20 to perform an OCR process on the job history information (image data) transmitted in step S305 and convert the image format of the image data.

In step S309, the communication control unit 4101 receives a response from the job history processing server 20. This response includes at least the success or failure of the data conversion process request process.

In step S310, the communication control unit 4101 confirms the content of the response received in step S309 and determines whether the data conversion process request process is successful.

Then, in a case where it is determined that the data conversion process request process is failed (NO in step S310), then in step S314, the communication control unit 4101 performs an error process. The details will be described later.

In a case where, on the other hand, it is determined in step S310 that the data conversion process request process is successful (YES in step S310), the processing proceeds to step S311.

In step S311, the communication control unit 4101 transmits a data transfer reservation cancellation together with the connection ID received in step S303 to the job history processing server 20. The data transfer reservation cancellation is performed to cancel the data transfer reservation transmitted to the job history processing server 20 in step S302. That is, the data transfer reservation cancellation is the process of notifying the job history processing server 20 that the transmission of the job history information (the sequence) is completed.

In step S312, the communication control unit 4101 receives a response from the job history processing server 20. This response includes at least the success or failure of the data transfer reservation cancellation process.

In step S313, the communication control unit 4101 confirms the content of the response received in step S312 and determines whether the data transfer reservation cancellation process is successful.

Then, in a case where it is determined that the data transfer reservation cancellation process is successful (YES in step S313), the processing of this flowchart ends.

In a case where, on the other hand, it is determined in step S313 that the data transfer reservation cancellation process is failed (NO in step S313), the processing proceeds to step S314.

In step S314, the communication control unit 4101 performs an error process, and the processing of this flowchart ends. In the error process, the communication control unit 4101 varies the processing content according to the response received from the job history processing server 20. For example, in the error process, the communication control unit 4101 may release an unnecessary resource, end the process of transmitting the job history information, and wait for the next transmission timing. Alternatively, the communication control unit 4101 may ignore the error in the response and end the process of transmitting the job history information. Further, in the error process, the communication control unit 4101 may display an error message on the operation unit 420 or transmit an error email, thereby notifying the user of the error.

Further, in a case where it is determined in step S301 that the "agent management server unusable flag" is on (YES in step S301), the processing proceeds to step S352.

In step S352, the communication control unit 4101 transmits a data transfer reservation together with temporary identification information saved in step S104 in FIG. 5 to the job history processing server 20. The process of step S352 is similar to that of step S302, except that temporary identification information saved in step S104 in FIG. 5 is transmitted instead of the final identification information. Thus, the process of step S352 is not described here.

In step S353, similarly to step S303, the communication control unit 4101 receives a response from the job history processing server 20.

In step S354, similarly to step S304, the communication control unit 4101 confirms the content of the response received in step S353 and determines whether the data transfer reservation process is successful.

Then, in a case where it is determined that the data transfer reservation process is successful (YES in step S354), the processing proceeds to step S305.

In a case where, on the other hand, it is determined that the data transfer reservation process is failed (NO in step S354), the processing proceeds to step S355.

In step S355, the communication control unit 4101 determines whether information indicating "agent management server recovery" is included in the response received in step S353. It is assumed that the information indicating "agent management server recovery" also includes final identification information. According to the present exemplary embodiment, a notification of final identification information is given by the job history processing server 20. Alternatively, after recognizing "agent management server recovery", the collection agent 41 may perform a request for issuance of final identification information.

Then, in a case where it is determined in step S355 that information indicating "agent management server recovery" is not included in the response received in step S353 (NO in step S355), then in step S314, the communication control unit 4101 performs the above error process.

In a case where, on the other hand, it is determined in step S355 that information indicating "agent management server recovery" is included in the response received in step S353 (YES in step S355), the processing proceeds to step S356.

In step S356, similarly to step S106 in FIG. 5, the communication control unit 4101 saves the final identification information in the HDD 404 via the file operation unit 4105.

In step S357, the communication control unit 4101 changes the "agent management server unusable flag" (the value of the <AgentMngSrvUnusableFlag> tag in FIG. 15) to off, and the processing of this flowchart ends.

Figure 8B:
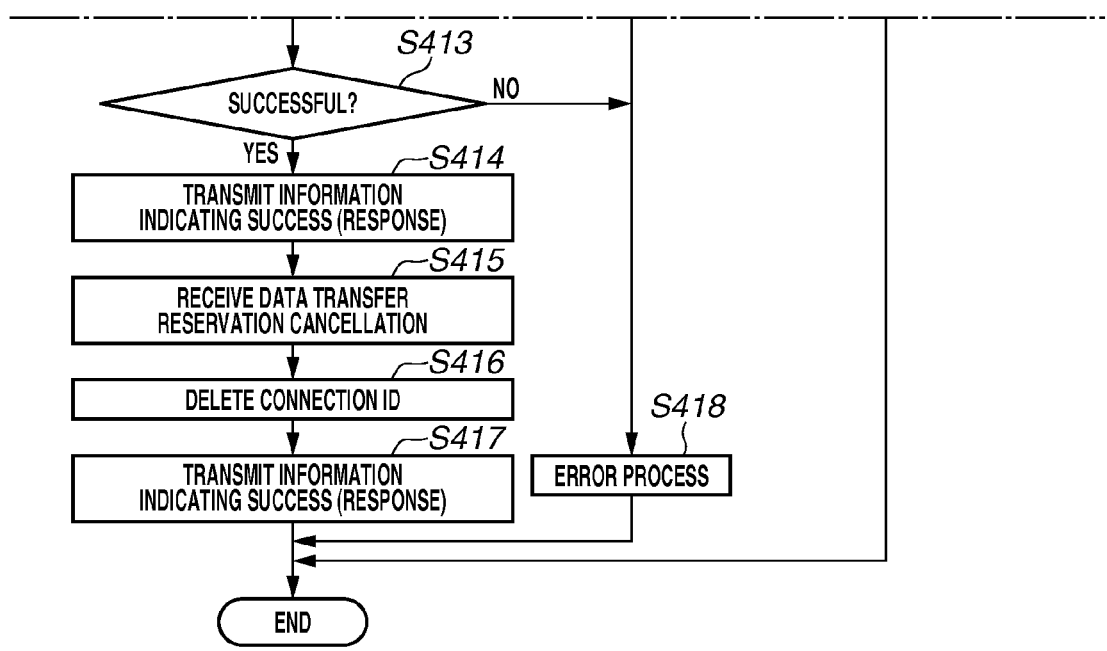

FIG. 8 is a diagram including the flowcharts of FIGS. 8A and 8B. FIGS. 8A and 8B are flowcharts illustrating an example of a process where the job history processing server 20 receives job history information from the collection agent 41 (a job history information reception process). Each step illustrated in the flowchart in FIG. 8 is achieved in such a manner that the CPU 200 of the job history processing server 20 executes a program stored in the external memory 209. Further, the CPU 200 uses the RAM 201 or the external memory 209 as a storage area, where necessary.

In step S400, the communication control unit 2001 receives a data transfer reservation from the collection agent 41. At this process, the communication control unit 2001 also receives the identification information (final identification information or temporary identification information) transmitted from the collection agent 41 in step S302 or S352 in FIG. 7.

In step S401, the communication control unit 2001 confirms the "agent management server unusable flag" (the value of the <UnusableFlag> tag in FIG. 16) and determines whether the "agent management server unusable flag" is on.

Then, in a case where it is determined that the "agent management server unusable flag" is off (NO in step S401), the processing proceeds to step S402.

In step S402, the communication control unit 2001 accesses the agent management server 10 and acquires setting information of the collection agent 41 corresponding to the identification information received in step S400. The setting information is setting information saved in step S201 in FIG. 6. If, however, information is added by another function or an external application after the process of step S201 is performed, the setting information may include the added information.

In step S403, the communication control unit 2001 determines whether the acquisition of the setting information in step S402 is successful.

Then, in a case where it is determined that the acquisition of the setting information is failed (NO in step S403), the processing proceeds to step S418. In step S418, the communication control unit 2001 performs an error process, and the processing of this flowchart ends. In the error process, for example, the communication control unit 2001 transmits, to the collection agent 41, information indicating that the data transfer reservation process is "failed".

In a case where, on the other hand, it is determined that the acquisition of the setting information is successful (YES in step S403), the processing proceeds to step S406.

In step S406, the communication control unit 2001 performs the process of issuing a connection ID. Specifically, the communication control unit 2001 confirms the number of collection agents currently connected to the communication control unit 2001. If the number is less than or equal to a prescribed value, the communication control unit 2001 issues a connection ID. The connection ID may be a value, such as alphanumeric characters, a numerical value, or a date and time, or the combination of these values, and may only need to be in a form with which connection to the collection agents 41 is uniquely determinable.

In step S407, the communication control unit 2001 transmits to the collection agent 41 the connection ID issued in step S406.

In step S408, the communication control unit 2001 receives job history information from the collection agent 41. The job history information is information transmitted from the communication control unit 4101 of the collection agent 41 in step S305 in FIG. 7.

In step S409, the communication control unit 2001 determines whether the reception of the job history information in step S408 is normally completed.

Then, in a case where it is determined that the reception is not normally completed (NO in step S409), the processing proceeds to step S418. In step S418, the communication control unit 2001 performs an error process, and the processing of this flowchart ends. In the error process, for example, the communication control unit 2001 transmits, to the collection agent 41, information indicating that the transmission of the job history information is "failed".

In a case where, on the other hand, it is determined that the reception is normally completed (YES in step S409), the processing proceeds to step S410.

In step S410, the communication control unit 2001 transmits, to the collection agent 41, information indicating that the transmission of the job history information is "successful".

In step S411, the communication control unit 2001 receives a data conversion process request from the collection agent 41. The details of the data conversion process request have already been described in step S308 in FIG. 7 and therefore are not described here.

In step S412, the communication control unit 2001 adds the job history information received in step S408 to a data conversion process target list. The data conversion process target list is a list for managing job history information as a target to be subjected to a data conversion process. Thus, in the process of adding the job history information to the data conversion process target list, the communication control unit 2001 may manage identification information (e.g., a connection ID) associated with the job history information, or may manage file information (a file name or a file path) of the job history information. Further, the communication control unit 2001 may add to the data conversion process target list the content of the process to be performed on the job history information.

In step S412, the communication control unit 2001 instructs, via the main control unit 2000, the job history information control unit 2004 to start a data conversion process on the job history information added to the data conversion process target list. According to the present exemplary embodiment, the communication control unit 2001 performs processing until the communication control unit 2001 instructs the job history information control unit 2004 to start a data conversion process. Alternatively, the communication control unit 2001 may perform processing until the process of adding the job history information to the data conversion process target list, and the job history information control unit 2004 may periodically reference the data conversion process target list and start the process. Further, according to the present exemplary embodiment, the data conversion process performed by the job history information control unit 2004 will be described as the data conversion process performed by another process (or another thread) with reference to FIG. 9, and the communication control unit 2001 is not concerned in the data conversion process. Alternatively, the exemplary embodiment may be implemented such that the communication control unit 2001 waits, without proceeding to the next step, until the data conversion process of the job history information control unit 2004 is completed.

In step S413, the communication control unit 2001 determines whether the processes of steps S411 and S412 are successful.

Then, in a case where it is determined that the process of at least either step S411 or S412 is failed (NO in step S413), the processing proceeds to step S418. In step S418, the communication control unit 2001 performs an error process, and the processing of this flowchart ends. In the error process, for example, the communication control unit 2001 transmits, to the collection agent 41, information indicating that the data conversion process request is "failed".

In a case where, on the other hand, it is determined that the processes of steps S411 and S412 are successful (YES in step S413), the processing proceeds to step S414.

In step S414, the communication control unit 2001 transmits, to the collection agent 41, information indicating that the data conversion process request is "successful".

In step S415, the communication control unit 2001 receives a data transfer reservation cancellation. When receiving a data transfer reservation cancellation, the communication control unit 2001 discards the connection ID issued in step S406. At this process, the transmission of the job history information includes a termination process after completion of the transmission of the job history information. In the termination process, the communication control unit 2001 discards the connection ID for managing the sequence of the job history information transmission process. If a connection ID associated with job history information included in the data conversion process target list is present separately, this connection ID does not need to be deleted.

In step S417, the communication control unit 2001 transmits, to the collection agent 41, information indicating that the process of step S416 (the data transfer reservation cancellation) is "successful", and the processing of this flowchart ends.

Although not illustrated in FIG. 8, in a case where the process of step S416 (the data transfer reservation cancellation) is failed, then in an error process, for example, the communication control unit 2001 transmits, to the collection agent 41, information indicating that the data transfer reservation cancellation is "failed", and the processing of this flowchart ends.

Further, in a case where it is determined in step S401 that the "agent management server unusable flag" is on (YES in step S401), the processing proceeds to step S404.

In step S404, the communication control unit 2001 instructs, via the main control unit 2000, the setting control unit 2003 to acquire setting information of the collection agent 41 corresponding to the identification information (temporary identification information) received in step S400 and locally saved in the external memory 209.

In step S405, the communication control unit 2001 determines whether the acquisition of the setting information in step S404 is successful.

Then, in a case where it is determined that the acquisition of the setting information in step S404 is successful (YES in step S405), the processing proceeds to step S406.

In a case where, on the other hand, it is determined that the acquisition of the setting information in step S404 is failed (NO in step S405), the processing proceeds to step S450.

The following can be mainly considered as the cause of the failure in the process of step S404.

The job history processing server 20 has a physical problem or a defect in the software environment.

The communication control unit 2001 becomes able to access the agent management server 10, and the temporary identification information created in step S205 in FIG. 6 and setting information are deleted in the process of step S604 in FIG. 10 described below.

In step S450, to confirm whether the communication control unit 2001 becomes able to access the agent management server 10, the communication control unit 2001 attempts to access the agent management server 10.

In step S451, the communication control unit 2001 determines whether the access process in step S450 is successful.

Then, in a case where it is determined that the access process in step S450 is failed (NO in step S451), the processing proceeds to step S418. In step S418, the communication control unit 2001 performs an error process, and the processing of this flowchart ends. In the error process, for example, the communication control unit 2001 transmits, to the collection agent 41, information indicating that the data transfer reservation is "failed".

In a case where, on the other hand, it is determined in step S451 that the access process in step S450 is successful (YES in step S451), the processing proceeds to step S452.

In step S452, the communication control unit 2001 acquires final identification information from the agent management server 10.

In step S453, the communication control unit 2001 changes the "agent management server unusable flag" to off. Specifically, the communication control unit 2001 changes the value of the <UnusableFlag> tag in FIG. 16 to off.

In step S454, the communication control unit 2001 transmits, to the collection agent 41, information indicating "agent management server recovery" and the final identification information, and the processing of this flowchart ends. The final identification information to be transmitted in step S454 is the information issued by the setting control unit 2003 in step S452 and acquired by the communication control unit 2001 via the main control unit 2000. The process of issuing the final identification information has already been described in step S207 in FIG. 6 and therefore is not described here.

Figure 9:
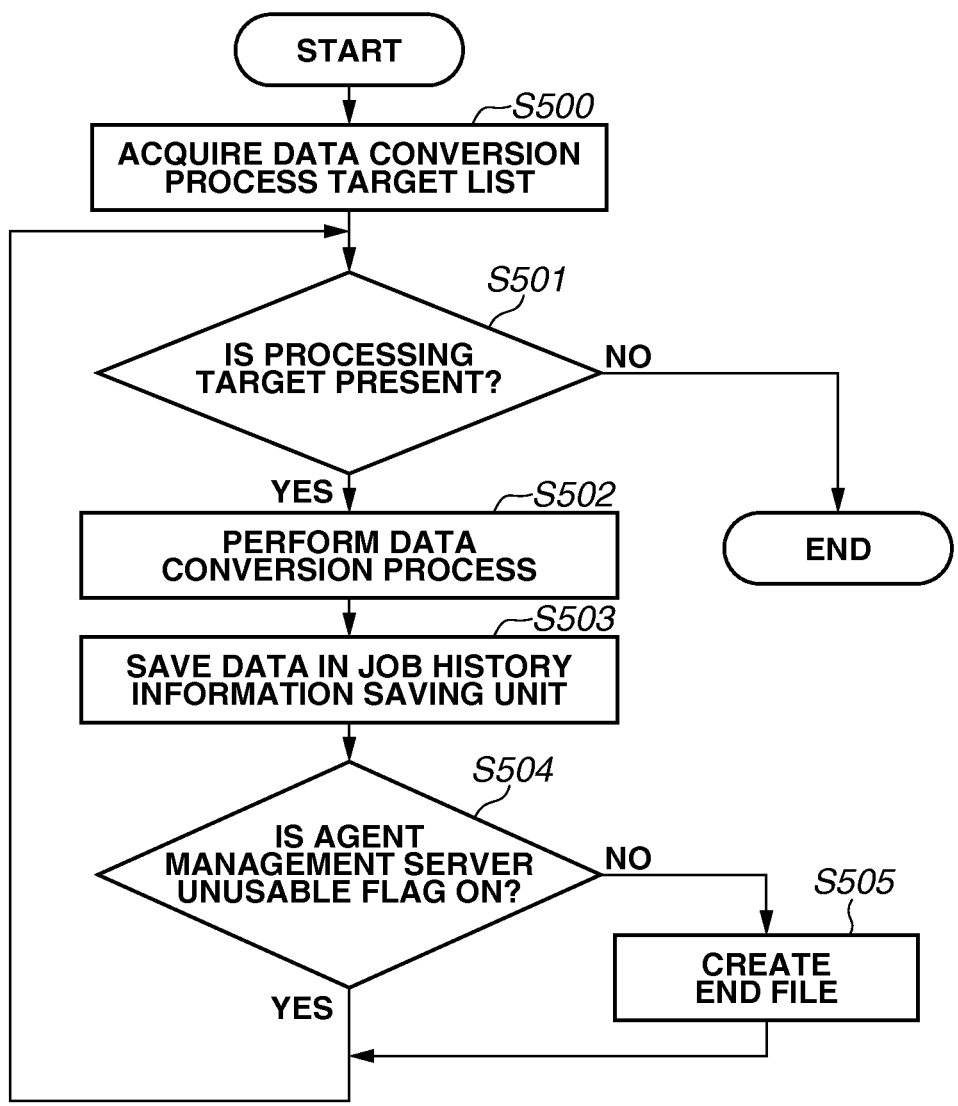
FIG. 9 is a flowchart illustrating a data conversion process performed by the job history processing server.

FIG. 9 is a flowchart illustrating the data conversion process performed by the job history information control unit 2004 of the job history processing server 20 on the job history information added to the data conversion process target list, when the job history information control unit 2004 receives the instruction from the communication control unit 2001 in step S412 in FIG. 8. As described above, the job history information control unit 2004 may periodically perform the process. Each step illustrated in the flowchart in FIG. 9 is achieved in such a manner that the CPU 200 of the job history processing server 20 executes a program stored in the external memory 209. Further, the CPU 200 uses the RAM 201 or the external memory 209 as a storage area, where necessary.

In step S500, the job history information control unit 2004 acquires the data conversion process target list created in step S412 in FIG. 8.

In step S501, the job history information control unit 2004 determines whether a processing target is present in the data conversion process target list acquired in step S500.

Then, in a case where it is determined that a processing target is present (YES in step S501), the processing proceeds to step S502.

In step S502, the job history information control unit 2004 acquires a single piece of job history information as the processing target from the data conversion process target list and performs the data conversion process on the single piece of job history information. In the data conversion process, the image processing unit 2005 receives an instruction from the job history information control unit 2004 and performs an OCR process on image data to acquire text and converts the image format of the image data. Further, the image processing unit 2005 may perform resolution conversion or rotation on the image data. Further, as part of the data conversion process, the image processing unit 2005 may convert log attribute information into a data format that allows cooperation with another system (e.g., an XML format or a comma-separated values (CSV) format). The log attribute information includes information about a job, such as information about a user having executed the job, information about the date and time of the execution of the job, information (an IP address, a serial number, or a MAC address) for identifying a digital MFP 40 having executed the job, and the type of the executed job. Specifically, as illustrated in FIG. 18, the log attribute information includes information (identification information or an IP address) that allows the identification of a collection agent 41, and job information (the type of the job, the date and time of the start of the job, or the result of the execution of the job).

FIG. 18 is a diagram illustrating an example of the log attribute information using the temporary identification information saved in the job history processing server 20.

Figure 19:
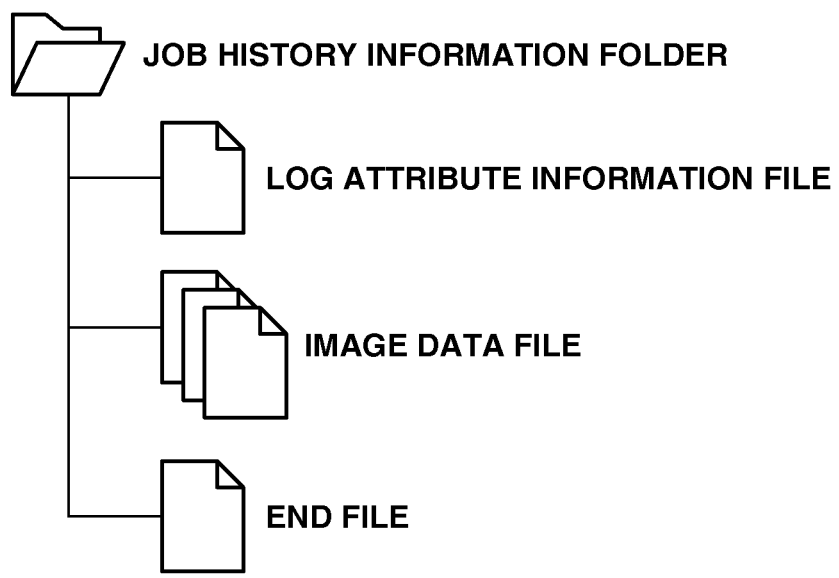
FIG. 19 is a diagram illustrating an example of a configuration of job history information saved in the job history processing server.

In step S503, the job history information control unit 2004 saves, in the saving unit 2007 via the file operation unit 2006, the result (data) of performing the data conversion process in step S502. According to the present exemplary embodiment, the result (data) is saved such that the log attribute information and the image data are saved in a folder in file formats such as a "log attribute information file" and an "image data file", as illustrated in FIG. 19. Alternatively, the formats may be such that the log attribute information and the image data are saved in a database. FIG. 19 is a diagram illustrating an example of the configuration of the job history information saved in the job history processing server 20.

In step S504, the job history information control unit 2004 confirms the "agent management server unusable flag" (the value of the <UnusableFlag> tag in FIG. 16) and determines whether the "agent management server unusable flag" is on.

Then, in a case where it is determined that the "agent management server unusable flag" is on (YES in step S504), the processing proceeds to step S501.

In a case where, on the other hand, it is determined that the "agent management server unusable flag" is off (NO in step S504), the processing proceeds to step S505.

In step S505, the job history information control unit 2004 creates an end file in the saving unit 2007 via the file operation unit 2006, and the processing of this flowchart ends. According to the present exemplary embodiment, as illustrated in FIG. 19, a folder is assigned to each piece of job history information, and a log attribute information file, an image data file, and an end file are created in this folder. The end file is information indicating that the processes of steps S502 and S503 on the job history information are completed. That is, the end file means that the user or another system becomes able to reference the job history information.

Specific examples of the end file include a zero-byte file having a fixed file name indicating the completion of the processes, a file of which the file name holds status information indicating the completion of the processes, and a file in which status information indicating the completion of the processes is written (or a form obtained by combining these examples).

Further, in a case where the result (data) is saved in a database in step S503, information as a substitute for the end file (information indicating the completion of the processes) may be held as a value for a particular key to the database.

A description is given of the reason why an end file is not created in a case where it is determined in step S504 that the "agent management server unusable flag" is on.

This is because job history information using temporary identification information is too incomplete for the user to search the job history information to trace an information leaker. Specifically, incomplete job history information includes temporary identification information and is insufficient as information for identifying a collection agent 41 (a digital MFP 40) having executed a job. Essentially, temporary identification information included in job history information should be promptly rewritten immediately after final identification information is issued. If, however, the incomplete job history information is referenced by an external system (another system), such as a job history checking system, and copied to another location, the final identification information cannot be reflected. An end file is prescribed as an external system cooperation interface in the system, whereby it becomes possible to prevent another system from referencing incomplete job history information.

Further, in a case where it is determined in step S501 that a processing target is not present (NO in step S501), the processing of this flowchart ends.

Figure 10:
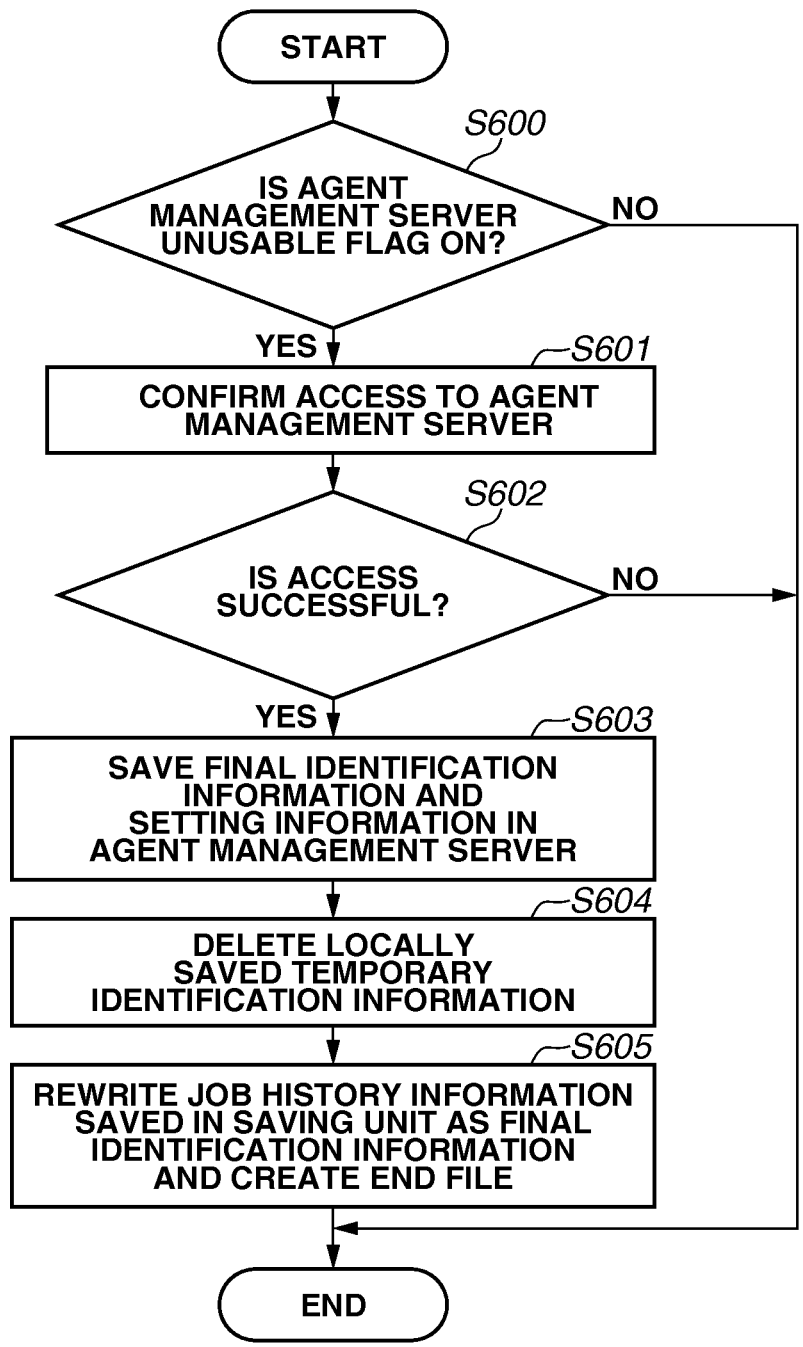
FIG. 10 is a flowchart illustrating a connection confirmation process performed by the job history processing server.

FIG. 10 is a flowchart illustrating a connection confirmation process periodically performed by the setting control unit 2003 of the job history processing server 20 in a case where the "agent management server unusable flag" is on, such that the setting control unit 2003 confirms connection to the agent management server 10. The processing of this flowchart is processing periodically performed by the setting control unit 2003. According to the present exemplary embodiment, the setting control unit 2003 counts certain intervals such as 10-minute intervals and executes the processing of the flowchart. Alternatively, a user interface may be prepared for enabling the user to set a processing execution schedule for executing the processing of the flowchart, and the setting control unit 2003 executes the processing of the flowchart according to the processing execution schedule. Yet alternatively, the setting control unit 2003 may receive a processing execution instruction from an external application and execute the processing of the flowchart. Each step illustrated in the flowchart in FIG. 10 is achieved in such a manner that the CPU 200 of the job history processing server 20 executes a program stored in the external memory 209. Further, the CPU 200 uses the RAM 201 or the external memory 209 as a storage area, where necessary.

In step S600, the setting control unit 2003 confirms the "agent management server unusable flag" (the value of the <UnusableFlag> tag in FIG. 16) and determines whether the "agent management server unusable flag" is on.

Then, in a case where it is determined that the "agent management server unusable flag" is off (NO in step S600), the processing of this flowchart ends.

In a case where, on the other hand, it is determined in step S600 that the "agent management server unusable flag" is on (YES in step S600), the processing proceeds to step S601.

In step S601, the setting control unit 2003 confirms whether the setting control unit 2003 can access the agent management server 10. Specifically, the setting control unit 2003 confirms the presence of a folder by using access information set in advance by the user. The determination of whether the setting control unit 2003 can access the agent management server 10 may be made by creating a folder or a file, instead of confirming the presence of a folder. The access information is acquired by the UI control unit 2002 displaying a dedicated screen on the display 208 and receiving an instruction from the user through the keyboard 207 or a pointing device (not illustrated). The setting control unit 2003 receives information from the UI control unit 2002 via the main control unit 2000. As illustrated in FIG. 16, the access information includes at least a user name, a password, and a path to the agent management server 10 for connection, and may include a path to a folder or a file.

In step S602, the setting control unit 2003 determines the result of the access confirmation in step S601.

Then, in a case where it is determined that the access confirmation in step S601 is failed (NO in step S602), the processing of this flowchart ends.

In a case where, on the other hand, it is determined that the access confirmation in step S601 is successful (YES in step S602), the processing proceeds to step S603.

In step S603, the setting control unit 2003 issues final identification information and saves the final identification information and setting information in the agent management server 10. This process is similar in content to that described in step S201 in FIG. 6 and therefore is not described in detail here. As the setting information, the setting information saved in step S205 in FIG. 6 is used. According to the present exemplary embodiment, a file saved in the saving unit 2007 using temporary identification information (the value of the <AgentID> tag is "A") as illustrated in FIG. 17 is rewritten so that the value of the <AgentID> tag is "6", which is final identification information, as illustrated in FIG. 20. Then, the final identification information is saved in the agent management server 10. The location for saving the final identification information in the agent management server 10 is a folder indicated by the value of a <Path> tag illustrated in FIG. 16.

In step S604, the setting control unit 2003 deletes the temporary identification information and the setting information saved in the saving unit 2007 in step S205 in FIG. 6.

In step S605, in the job history information saved in the saving unit 2007 in step S503 in FIG. 9 (i.e., the output result of exporting job history information as incomplete information including temporary agent information), the setting control unit 2003 rewrites the temporary agent information as formal agent information, and the processing of this flowchart ends. This rewriting process includes at least the process of rewriting temporary identification information as final identification information, and may rewrite another piece of information that allows the identification of a collection agent 41.

FIG. 21 is a diagram illustrating an example of the log attribute information using the final identification information saved in the job history processing server 20.

The example illustrated in FIG. 21 corresponds to the result of rewriting the value "A" of the <AgentID> tag, which is the temporary identification information in the example of FIG. 18, as "6", which is the final identification information. After the rewriting process, the setting control unit 2003 creates an end file in the saving unit 2007 via the file operation unit 2006. The end file has already been described in step S505 in FIG. 9 and therefore is not described here.

As described above, according to the first exemplary embodiment, even if some failure occurs in a service (the agent management server 10) for managing information about an agent, it is possible to collect job history from a new collection agent and export the job history as incomplete information. Further, when the failure in the agent management server 10 is removed, the new collection agent is registered in the agent management server 10. Then, based on information acquired from the agent management server 10, the job history exported as the incomplete information is promptly complemented to obtain complete information so that it is possible to promptly transfer the job history to an external system, such as a history checking system. Thus, even in a case where some failure occurs in the agent management server 10, for example, the operation is enabled in a state where the security (e.g., traceability when information is leaked) of a newly placed digital MFP 40 is ensured.

In FIG. 8, a configuration has been described in which in a case where it is not possible to acquire from the agent management server 10 the setting information of the collection agent 41 corresponding to the identification information of the agent 41 in step S403 (NO in step S403 or NO in step S451), the communication control unit 2001 performs an error process, and the processing of the flowchart ends. Alternatively, in a case where it is not possible to acquire from the agent management server 10 the setting information of the collection agent 41 corresponding to the identification information of the agent 41 in step S403 in FIG. 8 (NO in step S403 or NO in step S451), the communication control unit 2001 may request the setting information of the agent 41 to the collection agent 41 having transmitted the data transfer reservation received in step S400, acquires the setting information of the agent 41 and save the acquired setting information of the agent 41 in the saving unit 2007. Then, the processes of step S406 and thereafter may be performed using the setting information of the agent 41 saved in the saving unit 2007. That is, in a case where it is not possible to acquire from the agent management server 10 the setting information of the collection agent 41 corresponding to the identification information of the agent 41 included in a data transfer reservation request, the communication control unit 2001 may acquire the setting information of the agent 41 from the collection agent 41 having transmitted the data transfer reservation request and locally save the acquired the setting information of the agent 41. Then, the communication control unit 2001 may export data transferred from the collection agent 41, together with the locally saved setting information of the agent 41 to an area where the data and the setting information can be referenced by an external system such as a job history checking system.

As described above, alternatively, the job history processing server 20 may include the agent management server 10. Even with this configuration, it is possible to obtain a similar effect.

In a second exemplary embodiment, a case is described where there is a plurality of job history processing servers 20. In the second exemplary embodiment, only the differences from the first exemplary embodiment are described, and components similar to those of the first exemplary embodiment are not described here.

Figure 11:
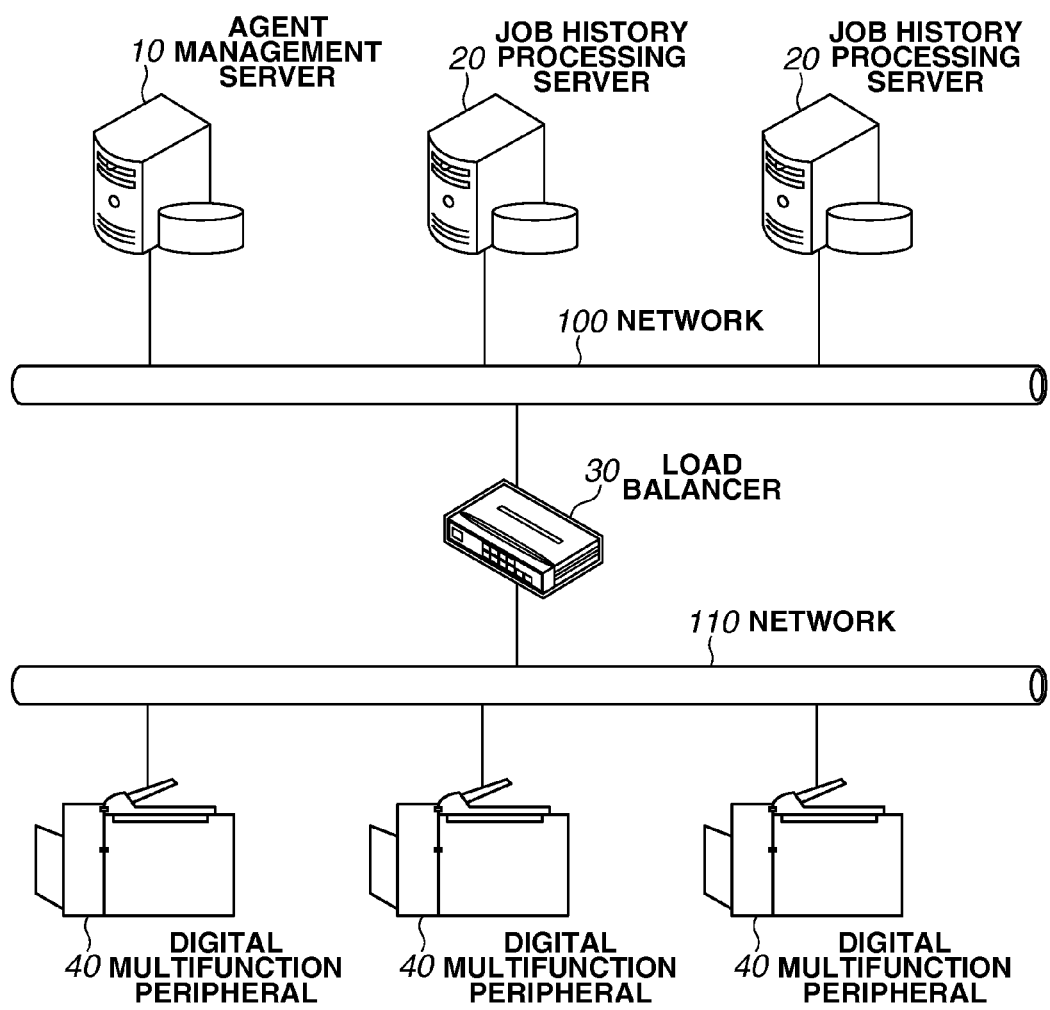
FIG. 11 is a diagram illustrating an overall configuration of a job history information processing system according to a second exemplary embodiment.

FIG. 11 is a diagram illustrating an example of the overall configuration of a job history information processing system according to the second exemplary embodiment. The second exemplary embodiment is different from the first exemplary embodiment in that two or more job history processing servers 20 are provided in the system, and a load distribution device (hereinafter, a "load balancer") is placed to achieve the system.

In the system according to the second exemplary embodiment, an agent management server 10 and two or more job history processing servers 20 are connected to a network 100, and digital MFPs 40 are connected to a network 110. The networks 100 and 110 are connected together via a load balancer 30.

The load balancer 30 is a general network device and has a function of sorting requests from collection agents 41 on the digital MFPs 40 while distributing load to the job history processing servers 20. To achieve the process (sequence) of repeating successive requests and responses, the load balancer 30 has a function of generating a cookie for a received request or response, attaching the cookie to the request or response, and transmitting the request or response. A cookie to be attached to a request or response received from each of the job history processing servers 20 includes at least network information (the IP address or the host name) of the corresponding job history processing server 20 as the connection destination. That is, the load balancer 30 distributes to the plurality of job history processing servers 20 the transfer destinations of data from the collection agents 41. Further, the load balancer 30 also has a function of interpreting server specifying information included in a request transmitted from each collection agent 41 and transmitting the request to a specified job history processing server 20.

The functions of the agent management server 10, the job history processing servers 20, and the digital MFPs 40 are similar to those in the first exemplary embodiment and therefore are not described here. The job history processing servers 20 according to the second exemplary embodiment receive data to be collected from the collection agents 41 via the load balancer 30.

FIG. 12 is a flowchart illustrating an example of an agent registration request process for registering each collection agent 41 in the system in the second exemplary embodiment. This process is processing performed when a collection agent 41 is started for the first time or when an execution instruction is received from the user. Each step illustrated in the flowchart in FIG. 12 is achieved in such a manner that the CPU 401 of the digital MFP 40 executes a program for achieving the collection agent 41, the program being stored in the ROM 403 or the HDD 404. Further, the CPU 401 uses the RAM 402 or the HDD 404 as a storage area, where necessary.

In the description of FIG. 12, only the differences from the processing illustrated in FIG. 5 are described.

In step S1000, similarly to step S100 in FIG. 5, the UI control unit 4102 acquires load balancer information from a user through the operation unit 420 of the digital MFP 40 or a screen provided remotely to an external device, such as a PC, and saves the load balancer information in the HDD 404. The process of step S1000 is similar to that of step S100 in FIG. 5, except that load balancer information is acquired instead of the communication server information. The load balancer information refers to information, such as the IP address or the host name of the load balancer 30, that allows network communication with the load balancer 30. According to the present exemplary embodiment, the load balancer information is held as the value of the <URL> tag in FIG. 15. Alternatively, another tag may be prepared.

The process of step S1001 is similar to that of step S101 and therefore is not described here.

In step S1002, similarly to step S102 in FIG. 5, the communication control unit 4101 receives a response from one of the job history processing servers 20. The response received at this process includes communication server information in addition to the success or failure of the agent registration request and identification information (final identification information or temporary identification information) issued by the job history processing server 20. The communication server information is information that allows the identification of communication information (the IP address or the host name) of the job history processing server 20 to which communication is distributed by the load balancer 30. Specifically, according to the present exemplary embodiment, a cookie issued by the load balancer 30 is used. Alternatively, the job history processing server 20 may transfer to the collection agent 41 communication information as a response. Moreover, the communication server information may be information in any form that allows the identification of the job history processing server 20 to which communication is distributed by the load balancer 30.

The processes of steps S1003 and S1004 are similar to those of steps S103 and S104 in FIG. 5 and therefore are not described here.

In step S1005, the communication control unit 4101 saves, in the HDD 404 via the file operation unit 4105, the communication server information included in the response received in step S1002. In the communication control unit 4101, for example, after the job history processing server 20 issues temporary identification information according to the agent registration request transmitted in S1001, the destination of data transfer is fixed to the job history processing server 20 having issued the temporary identification information.

The processes of steps S1006 and S1007 are similar to those of steps S105 and S106 in FIG. 5 and therefore are not described here.

Figure 13B:
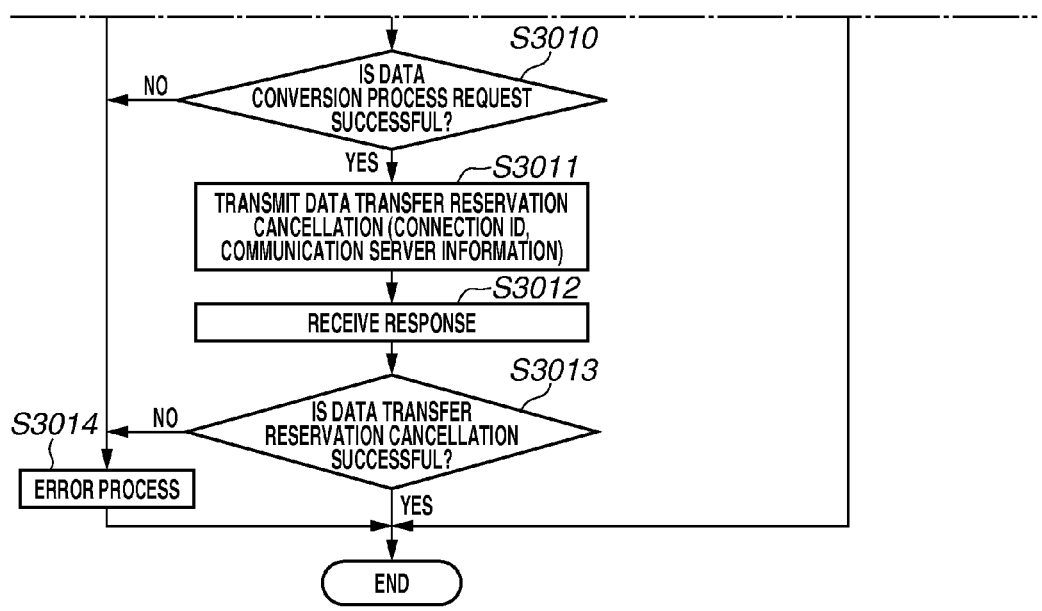

FIG. 13 is a diagram including the flowcharts of FIGS. 13A and 13B. FIGS. 13A and 13B are flowcharts illustrating a process where the collection agent 41 transmits job history information to the job history processing server 20 (a job history information transmission process) in the second exemplary embodiment. The job history information transmission process is performed when the collection agent 41 receives a transmission instruction from the user through a screen displayed on the operation unit 420 or the display 208, or immediately after a transmission time arrives. Each step illustrated in the flowchart in FIG. 13 is achieved in such a manner that the CPU 401 of the digital MFP 40 executes a program for achieving the collection agent 41, the program being stored in the ROM 403 or the HDD 404. Further, the CPU 401 uses the RAM 402 or the HDD 404 as a storage area, where necessary. The flowchart in FIG. 13 illustrates the process of transmitting a single record of job history. In a case where there is a plurality of records of job history in the HDD 404, the processing illustrated in FIG. 13 is repeated as many times as the number of records of job history in the HDD 404.

In the description of FIG. 13, only the differences from FIG. 7 are described. In FIG. 7 (the first exemplary embodiment), the job history processing server 20 is the communication partner of the collection agent 41. In FIG. 13 (the second exemplary embodiment), the load balancer 30 is the communication partner of the collection agent 41.

The processes of steps S3000 and S3001 are similar to those of steps S300 and S301 in FIG. 7 and therefore are not described here.

In step S3002, similarly to step S302 in FIG. 7, the communication control unit 4101 transmits a data transfer reservation to the load balancer 30. At this process, the communication control unit 4101 identifies the transmission destination using load the balancer information of the load balancer 30 saved in step S1000 in FIG. 12.

In step S3003, the communication control unit 4101 receives a response from the load balancer 30. This response includes at least communication server information in addition to the success or failure of the data transfer reservation process and a connection ID. The connection ID has been described in step S303 in FIG. 7 and therefore is not described here. The communication server information is information that, when the job history information is transmitted, allows the identification of communication information (the IP address or the host name) of the job history processing server 20 to which communication is distributed by the load balancer 30. The communication server information is, as described in step S1002 in FIG. 12, a cookie issued by the load balancer 30 and information included in the response from the job history processing server 20. The communication server information is information for transmitting the sequence of the job history information transmission process to the same job history processing server 20. Thus, similarly to the connection ID, the communication server information is used until the current job history information transmission process is completed. Thus, the communication control unit 4101 needs to hold the communication server information on a memory (the RAM 402) or the HDD 404.

The process of step S3004 is similar to that of step S304 in FIG. 7 and therefore is not described here.

In step S3005, the communication control unit 4101 transmits job history information together with the connection ID and the communication server information received in step S3003 to the load balancer 30.

The processes of steps S3006 and S3007 are similar to those of steps S306 and S307 and therefore are not described here.

In step S3008, the communication control unit 4101 transmits a data conversion process request together with the connection ID and the communication server information received in step S3003 to the load balancer 30.

The processes of steps S3009 and S3010 are similar to those of steps S309 and S310 in FIG. 7 and therefore are not described here.

In step S3011, the communication control unit 4101 transmits a data transfer reservation cancellation together with the connection ID and the communication server information included in the response received in step S3003 to the load balancer 30.

The processes of steps S3012 to S3014 are similar to those of steps S312 to S314 in FIG. 7 and therefore are not described here.

In step S3052, the communication control unit 4101 transmits a data transfer reservation to the load balancer 30. The process of step S3052 is similar to that of step S352 in FIG. 7, except that the temporary identification information saved in step S1004 in FIG. 12 and the communication server information saved in step S1005 in FIG. 12 are also simultaneously transmitted. Thus, the process of step S3052 is not described here.

In step S3053, similarly to step S3003, the communication control unit 4101 receives a response from the load balancer 30.

In step S3054, the communication control unit 4101 confirms the content of the response received in step S3053 and determines whether the data transfer reservation process is successful.

Then, in a case where it is determined that the data transfer reservation process is successful (YES in step S3054), the processing proceeds to step S3005.

In a case where, on the other hand, it is determined that the data transfer reservation process is failed (NO in step S3054), the processing proceeds to step S3055.

The process of step S3055 is similar to that of step S355 in FIG. 7 and therefore is not described here.

In step S3056, similarly to step S1007 in FIG. 12, the communication control unit 4101 saves the identification information included in the response received in step S3055, as final identification information in the HDD 404 via the file operation unit 4105.

In step S3057, the communication control unit 4101 deletes the communication server information saved in step S1005 in FIG. 12.

The process of step S3058 is similar to that of step S357 in FIG. 7 and therefore is not described here. When the process of step S3058 ends, the processing of this flowchart ends.

As illustrated above, according to the second exemplary embodiment, in the case of the configuration in which load is distributed to the plurality of job history processing servers 20 via the load balancer 30, even if some failure occurs in a service (the agent management server 10) for managing information about an agent, it is possible to collect job history from a new collection agent and export the job history as incomplete information. Further, in a case where the failure in the agent management server 10 is removed, a new collection agent is registered in the agent management server 10. Then, based on information acquired from the agent management server 10, the job history exported as the incomplete information is promptly complemented to obtain complete information so that it is possible to promptly transfer the job history to an external system, such as a history checking system. Thus, in the case of the configuration in which load is distributed to the plurality of job history processing servers 20 via the load balancer 30, even if some failure occurs in the agent management server 10, for example, the operation is enabled in a state where the security (e.g., traceability when information is leaked) of a newly placed digital MFP 40 is ensured.

According to the above exemplary embodiments, the collection source of information to be received by the job history processing server 20 is an image forming apparatus (a printing apparatus), such as the digital MFP 40. However, the collection source of information to be received by the job history processing server 20 is not limited to an image forming apparatus, and may be any of an information processing apparatus, such as a PC, and a network device, such as a network household electrical appliance.

Further, a configuration has been described in which the collection agent 41 operates on a network device as an information collection source, such as the digital MFP 40. Alternatively, a program corresponding to the collection agent 41 may be installed in another network device, such as a PC, capable of collecting, from a device as an information collection source, job history recorded by the device, and the collection agent 41 may operate on another network device. In the case of this configuration, the collection agent 41 that operates on another network device collects, from a device, such as the digital MFP 40, job history recorded by the device and transmits the job history to the job history processing server 20. With such a configuration, the job history processing server 20 can receive even information about a device on which the collection agent 41 cannot operate.

Further, according to the above exemplary embodiments, job history is recorded by a device as an information collection source, such as the digital MFP 40, and transmitted to the job history processing server 20. Alternatively, instead of the device as the information collection source, such as the digital MFP 40, another network device, such as a PC, for submitting a job to the device may record job history and transmit the job history to the job history processing server 20. That is, a program corresponding to the collection agent 41 may be installed in another network device, such as a PC, and the collection agent 41 may operate on another network device.

Further, according to the above exemplary embodiments, in view of the processing efficiency of the job history processing server 20, the recovery of the agent management server 10 is periodically checked. Alternatively, every time the job history processing server receives a job history transmission reservation, the recovery of the agent management server 10 may be checked.

As illustrated above, according to the exemplary embodiments, for example, in a case where a request to register the collection agent 41 is performed and in a case where the job history processing server 20 cannot connect to the agent management server 10, the job history processing server 20 issues temporary identification information for use of when the job history processing server 20 cannot access the agent management server 10, and saves job history information in an incomplete state, using the temporary identification information. Then, after the job history processing server 20 becomes able to connect to the agent management server 10, the job history processing server 20 issues final identification information and notifies the collection agent 41 of the final identification information. At this process, after issuing the final identification information, the job history processing server 20 complements, based on the final identification information, the incomplete job history information saved using the temporary identification information. Then, the job history processing server 20 creates an end file meaning the completion of the job history information, thereby obtaining complete job history information.

With such a configuration, even while a service (the agent management server 10) for managing an agent operating on a network device to collect data is stopped, it is possible to newly place a collection agent (it is possible to receive data from an unregistered collection agent). This enables the operation of, for example, a newly placed network device, such as a digital MFP, a printer, or a network household electrical appliance in a state where the security (for example, traceability when information is leaked) of the network device is ensured.

That is, it becomes possible to solve the issue that even in a case where a failure in an agent setting information management function used by a job history processing server is prolonged, a network device, such as a digital MFP, a printer, or a network household electrical appliance cannot be used practically due to the fact that a collection agent cannot be registered even though the network device is newly placed.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-169272, filed Aug. 22, 2014, which is hereby incorporated by reference herein in its entirety.

What is claimed is:

1. A management system for receiving data to be collected from an agent operating on a network device, the management system comprising:
   an issuance unit configured to issue second agent information for use of when first agent information cannot be acquired from an agent management service;
   a reception unit configured to receive a data transfer reservation request including identification information of an agent;
   a request unit configured to request, from the agent management service, the first agent information corresponding to the identification information included in the reservation request; and
   an output unit configured to, in a case where the first agent information is acquired from the agent management service, export data received from the agent together with the acquired first agent information to an area where the data and the first agent information can be referenced by an external system,
   wherein, in a case where the first agent information cannot be acquired from the agent management service, the output unit exports, as incomplete information, data received from the agent together with the second agent information issued by the issuance unit to an area where the data and the second agent information can be referenced by the external system.

2. The management system according to claim 1, wherein, in a case where agent information cannot be registered in the agent management service, the issuance unit issues the second agent information.

3. The management system according to claim 1, wherein, in a case where the first agent information is acquired, the output unit exports data received from the agent and the acquired first agent information together with a file indicating that reference is possible, and in a case where the first agent information cannot be acquired, the output unit exports data received from the agent and the second agent information as incomplete information that does not include the file indicating that reference is possible.

4. The management system according to claim 3, wherein, in a case where the first agent information becomes able to be acquired from the agent management service, the output unit complements, using the first agent information, an output result of exporting the data and the second agent information and adds to the complemented output result the file indicating that reference is possible.

5. The management system according to claim 1, wherein the first agent information includes at least the identification information of the agent, and
wherein the second agent information includes at least temporary identification information of the agent.

6. The management system according to claim 1, wherein the management system receives, via a load balancer, data to be collected from an agent operating on a network device.

7. The management system according to claim 6, wherein the load balancer distributes to a plurality of management systems a transfer destination of data from the agent.

8. The management system according to claim 7, wherein, after the second agent information is issued, a destination of data transfer via the load balancer from the agent to which the second agent information is issued is fixed to one of the management systems that has issued the second agent information.

9. The management system according to claim 8, wherein, in a case where the first agent information becomes able to be acquired from the agent management service, the fixing of the destination is cancelled.

10. The management system according to claim 1, wherein the network device is a printing apparatus, an information processing apparatus capable of collecting the data to be collected from a printing apparatus, or an information processing apparatus for submitting a job to a printing apparatus.

11. The management system according to claim 1, wherein the data to be collected is log information of a job executed by a printing apparatus.

12. The management system according to claim 1, wherein the agent management service holds the first agent information so that the first agent information can be referenced by the management system.

13. A method for controlling a management system for receiving data to be collected from an agent operating on a network device, the method comprising:
issuing second agent information for use of when first agent information cannot be acquired from an agent management service;
receiving a data transfer reservation request including identification information of an agent;
requesting, from the agent management service, the first agent information corresponding to the identification information included in the reservation request; and
exporting, in a case where the first agent information is acquired from the agent management service, data received from the network device together with the acquired first agent information to an area where the data and the first agent information can be referenced by an external system,
wherein in the exporting, in a case where the first agent information cannot be acquired from the agent management service, data received from the agent is exported as incomplete information together with the second agent information issued in the issuing to an area where the data and the second agent information can be referenced by the external system.

* * * * *